(12) United States Patent
Magai

(10) Patent No.: US 11,386,576 B2
(45) Date of Patent: Jul. 12, 2022

(54) IMAGE PROCESSING APPARATUS, METHOD OF TRACKING A TARGET OBJECT, AND STORAGE MEDIUM

(71) Applicant: CANON KABUSHIKI KAISHA, Tokyo (JP)

(72) Inventor: Koichi Magai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 16/940,178

(22) Filed: Jul. 27, 2020

(65) Prior Publication Data

US 2021/0035327 A1 Feb. 4, 2021

(30) Foreign Application Priority Data

Jul. 30, 2019 (JP) .............................. JP2019-140086

(51) Int. Cl.
*G06T 7/73* (2017.01)
*G06T 7/90* (2017.01)
(Continued)

(52) U.S. Cl.
CPC ............... *G06T 7/74* (2017.01); *G06T 7/20* (2013.01); *G06T 7/90* (2017.01); *G06F 3/14* (2013.01); *G06T 2207/10024* (2013.01)

(58) Field of Classification Search
CPC .... G06T 7/74; G06T 7/20; G06T 7/90; G06T 2207/10024; G06T 2207/10016;
(Continued)

(56) References Cited

U.S. PATENT DOCUMENTS 5,566,251 A * 10/1996 Hanna .................... H04N 5/272
348/588
10,132,913 B2 * 11/2018 Ogura ................ H04N 5/23296
(Continued)

FOREIGN PATENT DOCUMENTS

JP 2002373332 A 12/2002
JP 2007257358 A 10/2007

OTHER PUBLICATIONS

Satoshi Kunimitsu, et al., Detection of Object under Outdoor Environment with Binary Edge Image for Template, IEEJ Trans, EIS, 2004, pp. 480-488, vol. 124, No. 2.
(Continued)

*Primary Examiner* — Ali Bayat
(74) *Attorney, Agent, or Firm* — Canon U.S.A., Inc. IP Division

(57) ABSTRACT

An image processing apparatus that tracks a target object by estimating a position of the target object on each of a plurality of images. A first estimating unit estimates the position of the target object in at least one of images. A second estimating unit estimates the position of the target object in at least one of images, wherein estimating accuracy of the position of the target object in the second estimating process is lower than the estimating accuracy in the first estimation process. A correcting unit corrects the position of the target object estimated by the second estimation process on a second image, based on the position of the target object estimated by the first estimation process on a first image. The second image is an image captured at a different time from the first image.

19 Claims, 15 Drawing Sheets

(51) Int. Cl.
*G06T 7/20* (2017.01)
*G06F 3/14* (2006.01)

(58) Field of Classification Search
CPC . G06T 2207/30196; G06T 7/70; G06T 7/246; G06T 7/73; G06T 2207/20081; G06T 2207/20084; G06F 3/14
USPC .......................................................... 382/103
See application file for complete search history.

(56) References Cited

U.S. PATENT DOCUMENTS

| | | | | |
|---|---|---|---|---|
| 10,880,464 | B1* | 12/2020 | Kim | G06T 7/20 |
| 2009/0041297 | A1* | 2/2009 | Zhang | G06K 9/00362 |
| | | | | 382/103 |
| 2009/0059007 | A1 | 3/2009 | Wagg | |
| 2010/0166261 | A1* | 7/2010 | Tsuji | G06K 9/4652 |
| | | | | 382/103 |
| 2014/0241573 | A1* | 8/2014 | Goel | G06T 5/005 |
| | | | | 382/103 |
| 2015/0355102 | A1* | 12/2015 | Kido | G01N 21/8806 |
| | | | | 348/46 |
| 2016/0364619 | A1* | 12/2016 | Ogata | G08G 1/166 |
| 2017/0116749 | A1* | 4/2017 | Kuroda | G06T 7/20 |

OTHER PUBLICATIONS

Pedro F Felzenszwalb, et al., Object detection with discriminatively trained part-based models, TPAMI, 2010, pp. 1-20, vol. 32, No. 9.
Genshiro Kitagawa, On Monte Carlo Filter and Smoother, Proceedings of the Institute of Statistical Mathematics, 1996, pp. 31-48, vol. 44, No. 1.
Huang Wenchao, et al. "Real-Time Multi-Modal People Detection and Tracking of Mobile Robots with A RGB-D Sensor" 2019 IEEE 4th International Conference on Advanced Robotics and Mechatronics (ICARM), IEEE, Jul. 2019, pp. 325-330.
Juan Li, et al., "Real Time Tracking of Moving Pedestrians", Measuring Technology and Mechatronics Automation, 2009, ICMTA '09. International Conference on IEEE, NJ, US, Apr. 11, 2009, pp. 811-815.

* cited by examiner

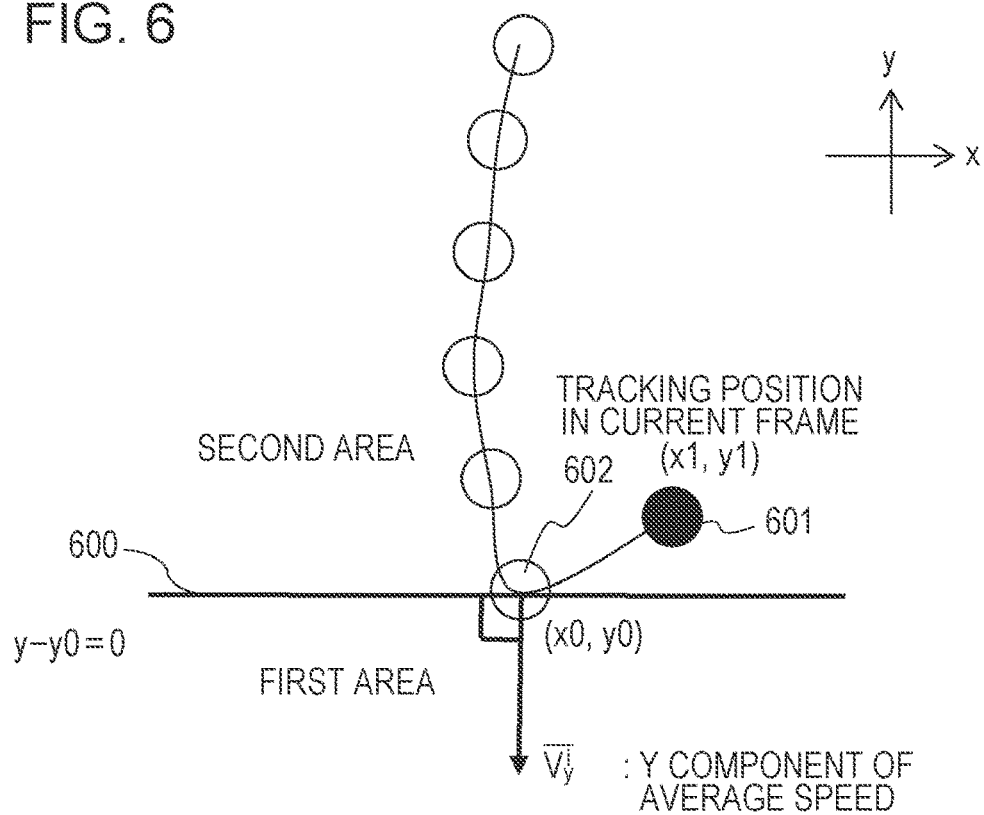
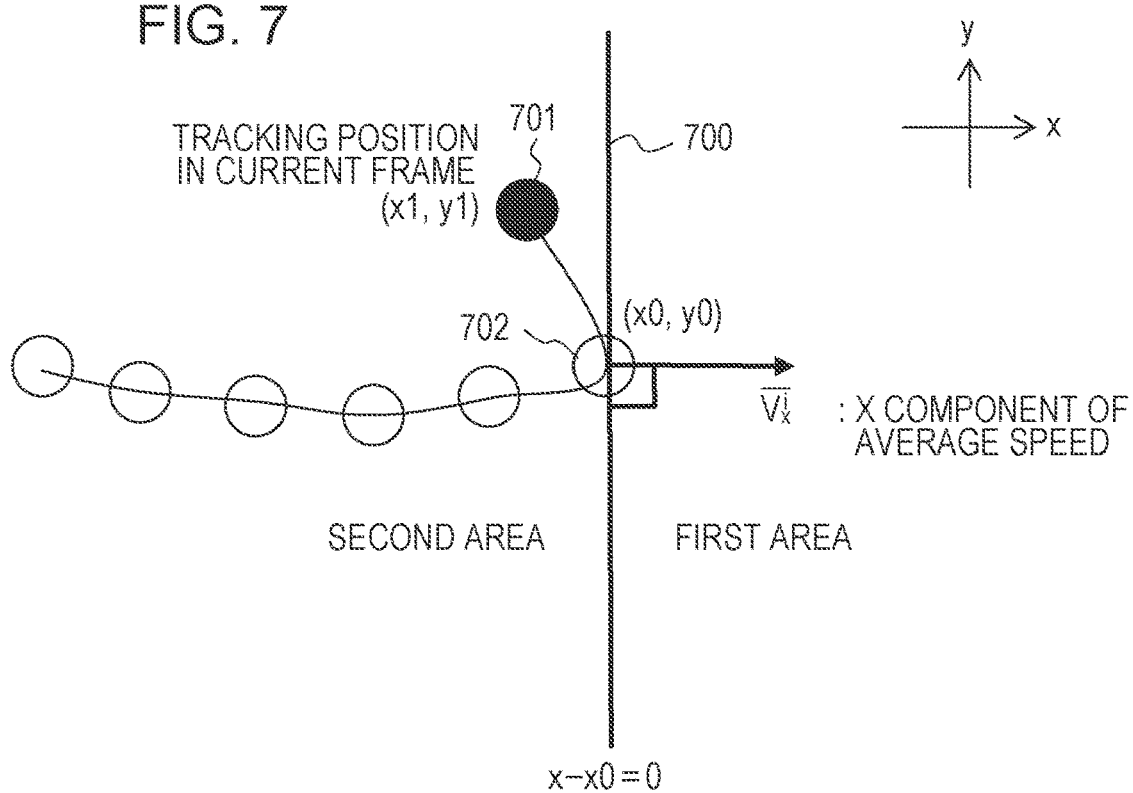

IMAGE PROCESSING APPARATUS, METHOD OF TRACKING A TARGET OBJECT, AND STORAGE MEDIUM

BACKGROUND OF THE INVENTION

Field of the Invention

The present disclosure relates to an image processing apparatus, a method of tracking a target object, and a storage medium.

Description of the Related Art

Technologies to track objects or human bodies detected from images that are captured by cameras have hitherto been proposed. Japanese Patent Laid-Open No. 2002-373332 proposes a technology to perform tracking using template matching considering how templates are overlapped with each other to estimate a search position on the subsequent frame image from a motion vector. In addition, Japanese Patent Laid-Open No. 2007-257358 proposes a technology to efficiently detect and track a concerned object using a pyramid image in order to support enlargement and reduction of the concerned object that is being tracked and using the fact that frame images that are temporally close to each other has high correlation. In other words, when the concerned object is detected in any level in the pyramid image on the preceding frame image, the object detection process is performed for the subsequent frame image on the same level as the level on which the concerned object has been detected on the preceding frame image.

SUMMARY OF THE INVENTION

According to one embodiment of the present disclosure, an image processing apparatus that tracks a target object by estimating a position of the target object on each of a plurality of images, comprises: a first estimating unit configured to perform a first estimation process to estimate the position of the target object in at least one of the plurality of images; a second estimating unit configured to perform a second estimating process to estimate the position of the target object in at least one of the plurality of images, wherein estimating accuracy of the position of the target object in the second estimation process is lower than the estimating accuracy in the first estimation process; and a correcting unit configured to, based on the position of the target object estimated by the first estimation process on a first image of the plurality of images, correct the position of the target object estimated by the second estimation process on a second image of the plurality of the images, wherein the second image is an image captured at a different time from the first image.

According to another embodiment of the present disclosure, a method of tracking a target object comprises: performing a first estimation process to estimate the position of the target object in at least one of the plurality of images; performing a second estimating process to estimate the position of the target object in at least one of the plurality of images, wherein estimating accuracy of the position of the target object in the second estimation process is lower than the estimating accuracy in the first estimation process; and correcting the position of the target object estimated by the second estimation process on a second image of the plurality of the images, based on the position of the target object estimated by the first estimation process on a first image of the plurality of images, wherein the second image is an image captured at a different time from the first image.

Further features of the present disclosure will become apparent from the following description of exemplary embodiments with reference to the attached drawings.

BRIEF DESCRIPTION OF THE DRAWINGS

FIG. 6 is an explanatory diagram of determination of the shift of the tracking position (Case 2);

FIG. 7 is an explanatory diagram of determination of the shift of the tracking position (Case 3);

DESCRIPTION OF THE EMBODIMENTS

Figure 1:
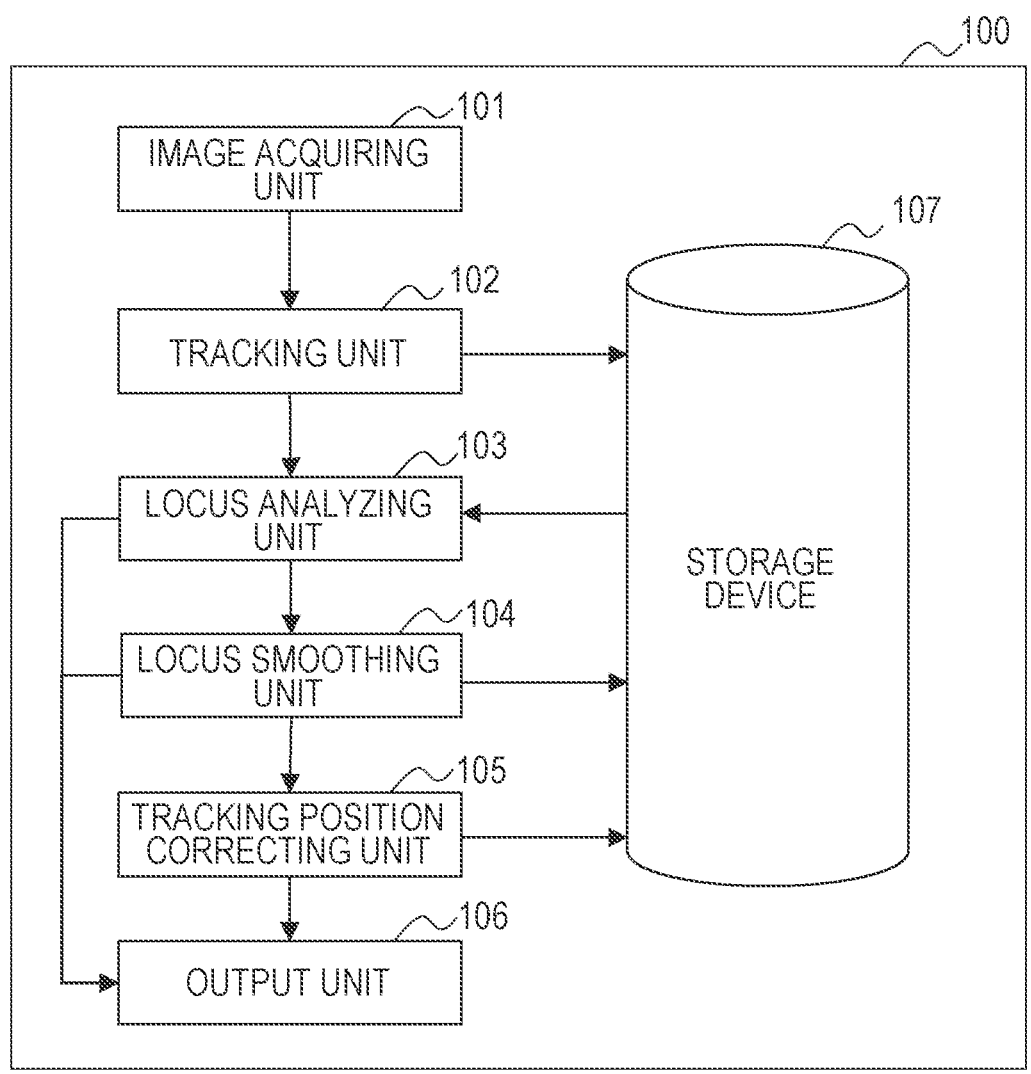
FIG. 1 is a block diagram illustrating an example of the configuration of an image processing apparatus of a first embodiment.

In the methods described in Japanese Patent Laid-Open No. 2002-373332 and Japanese Patent Laid-Open No. 2007-257358, the position where a concerned object appears and the size of the object are estimated on the subsequent frame image based on the moving direction, the speed, or the size of the object on the immediately preceding frame image to set a search area based on the estimation. The search for the concerned object only in the search area not only reduces the processing cost but also inhibits an object other than the concerned object that should be tracked from being erroneously recognized as a tracking target. However, in the object detection process, a tracking position indicating the position where the object, which is the tracking target, is detected may be shifted generally due to the influence of a peripheral similar pattern including noise and background or an adjacent object.

In order to resolve the above issue, according to an embodiment of the present disclosure, it is possible to suppress the shift of the tracking position of an object in an image in tracking of the object.

Embodiments of the present disclosure will herein be described in detail with reference to the drawings. The configurations indicated in the embodiments described below are only examples and the present disclosure is not limited to the configurations illustrated in the drawings.

An image processing apparatus according to an embodiment detects the concerned object across the images of multiple frames to track the concerned object. In the object detection process to detect an object, the tracking position of the object to be tracked may be slightly shifted generally due to the influence of a peripheral similar pattern including noise and background or an adjacent object. This slight shift of the tracking position may become an issue. For example, in counting of the number of human bodies passing through a certain line in an image, such a slight shift of the tracking position may become an issue. Here, the passing line is set in the horizontal direction in a central portion of the screen for description. It is assumed that the number of human bodies passing through the passing line from the top to the bottom is counted as In and the number of human bodies passing through the passing line from the bottom to the top is counted as Out. A case will now be considered in which a slight shift occurs near the passing line during tracking of a human body moving from the top to the bottom. When the human body passes through the passing line from the bottom to the top due to the slight shift occurring in a direction opposite to the movement direction on the subsequent frame image although the human body is counted as In on the preceding frame image, the count of Out is incremented by one on this frame image. In addition, since the shift is corrected on the subsequent frame and the human body passes through the passing line from the top to the bottom again, the count of In is incremented by one. As a result, one error count of In and one error count of Out occur. Accordingly, with the image processing apparatus according to the present embodiment, it is possible to suppress the shift of the tracking position of an object in an image to suppress an occurrence of the error count in the counting of the number of human bodies passing through the certain line.

In addition, in the tracking of the concerned object in an image, smoothing of a locus may be performed in order to reduce the influence of the slight shift of the tracking position included in the locus of the concerned object to be tracked. Also in the counting of the number of human bodies passing through the certain line, the error count is capable of being suppressed by smoothing the locus before the tracking position is determined to correct the tracking position. However, minute information about the locus is lost with the method of evenly smoothing the locus. As a result, for example, determination of a suspicious behavior such as wandering of a human body is disabled to cause a problem. Accordingly, with the image processing apparatus according to the present embodiment, it is possible to suppress the shift of the tracking position while suppressing the loss of the minute information about the locus. The image processing apparatus according to the present embodiment will be described.

The image processing apparatus according to the present embodiment has a function to correct the shift of the tracking position of the concerned object using past locus information that is recorded. Use of the locus information enables the positions on the frame images of the concerned object to be tracked (hereinafter referred to as a tracking target object) to be identified for the respective frames in time series order. The locus information represents a tracking history of each frame when the tracking target object has been tracked. The locus information includes, for example, an object identifier (ID) (object identification information) for identifying each object on the frame image, the position of the object on the frame image (the object position), and temporal information about each frame. The locus information may include the size of the tracking target object (the size on the frame image), attribute information about the object, and so on. Although the human body is exemplified as the tracking target object in the following description, the tracking target object is not limited to the human body and may be an arbitrary object.

First Embodiment

FIG. 1 is a block diagram illustrating an example of the configuration of an image processing apparatus 100 of a first embodiment.

The image processing apparatus 100 of the first embodiment includes an image acquiring unit 101, a tracking unit 102, a locus analyzing unit 103, a locus smoothing unit 104, a tracking position correcting unit 105, an output unit 106, and a storage device 107.

Figure 2:
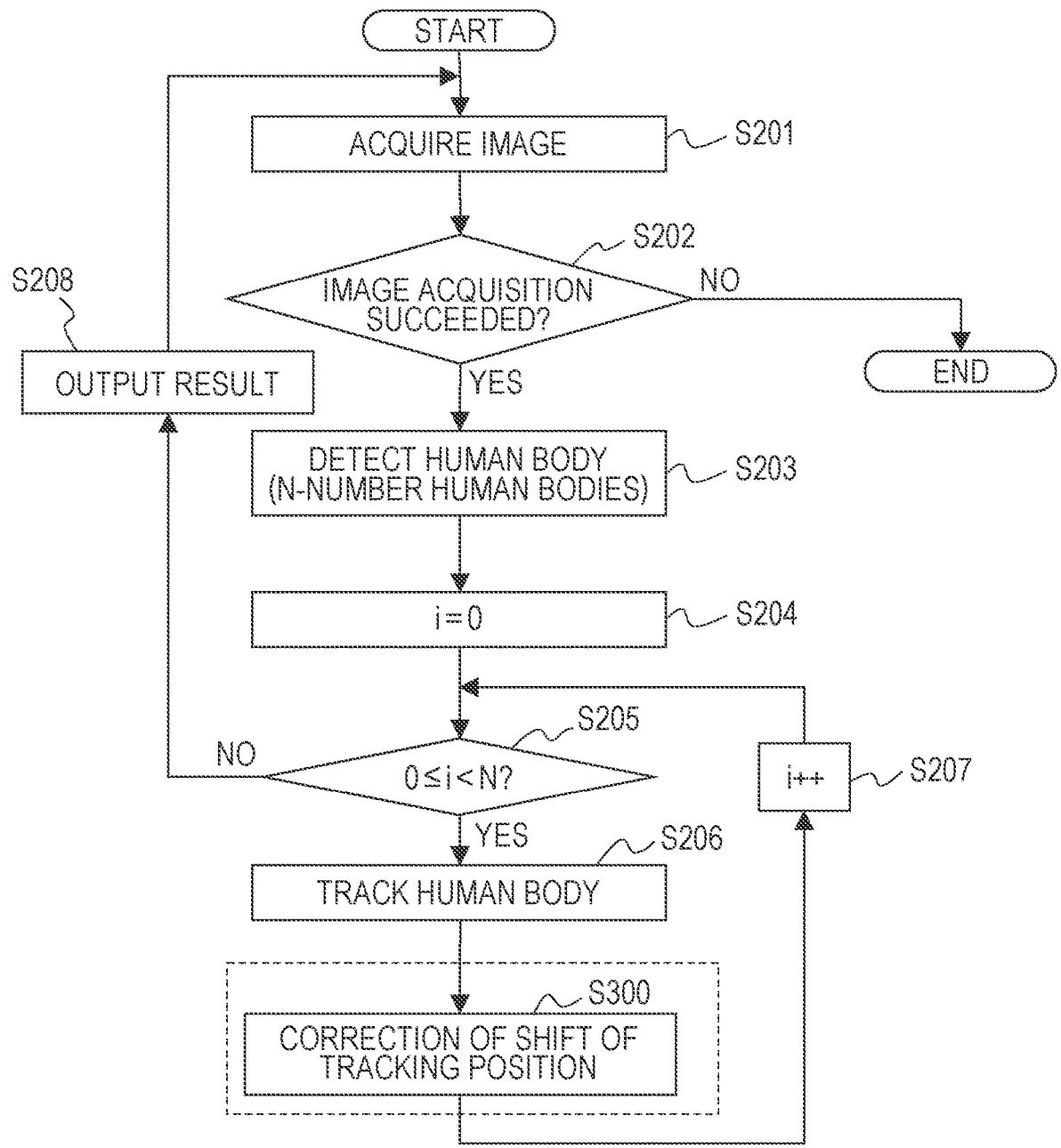
FIG. 2 is a flowchart illustrating an example of an image processing process in the image processing apparatus of the first embodiment.

FIG. 2 is a flowchart illustrating an example of an image processing process in the image processing apparatus 100 of the first embodiment. FIG. 2 illustrates a processing flow from detection and tracking of an object (human body) to correction of the shift of the tracking position.

Referring to FIG. 2, in Step S201, the image acquiring unit 101 acquires images to be processed in time series order from an external apparatus, such as a camera or a server. In other words, the image acquiring unit 101 acquires images captured by the camera. For example, the respective frame images composing a moving picture are supposed as the images in time series order. The image acquiring unit 101 may acquire the images in time series order stored in an external memory or the like. In Step S202, the image processing apparatus 100 determines whether the image acquisition succeeded. When the image acquisition by the image acquiring unit 101 failed or the image acquisition is stopped by a user, the image processing apparatus 100 determines that the image acquisition failed. If the image processing apparatus 100 determines that the image acquisition failed (NO in Step S202), the process in the flowchart in FIG. 2 is terminated.

If the image processing apparatus 100 determines that the image acquisition succeeded (YES in Step S202), in Step S203, the tracking unit 102 detects the tracking target object (the concerned object) from an image of a concerned frame (the current frame) acquired by the image acquiring unit 101. It is assumed in the first embodiment that n-number objects are detected (n-number human bodies are detected). In addition, a background subtraction method is used as the method of detecting an object in the first embodiment. The object to be detected here is, for example, a moving object or a foreground detected using the background subtraction method. Alternatively, the object to be detected may be a portion that is determined not to be the background. The information about the object detected by the tracking unit 102 includes the position on a concerned frame image, a circumscribed rectangle of the detected object, and the size of the circumscribed rectangle. In Step S204, the tracking unit 102 initializes a variable i. The tracking unit 102 manages each object detected in Step S203 using the variable i initialized in Step S204.

In Step S205, the tracking unit 102 determines whether the value of the variable i is lower than N. If the tracking unit 102 determines that the value of the variable i is lower than N (YES in Step S205), the process goes to Step S206. If the tracking unit 102 determines that the value of the variable i is not lower than N (NO in Step S205), the process goes to Step S208.

In Step S208, the tracking unit 102 outputs the tracking result. Information about the tracking result is stored (recorded) in the storage device 107. Then, the process goes back to Step S201.

If the value of the variable i is lower than N (YES in S205), in Step S206, the tracking unit 102 detects a human body from a local area where the object of the variable i is detected and associates the detected object with the detected human body to determine a tracking area of the variable i. The human body of the variable i is hereinafter referred to as a human body i and the tracking area of the variable i is hereinafter referred to as a tracking area i. In the first embodiment, the detection of the human body is performed using a pattern matching process. The tracking unit 102 newly adds a human body ID to the human body who newly appears. When the association between the human body detected from the concerned frame image and the human body that is detected on the preceding frame image of the concerned frame in time series order succeeded, the tracking unit 102 adds the human body ID added on the preceding frame image is added also to the human body detected from the concerned frame image. The tracking unit 102 associates the human body detected from the concerned frame image with the human body detected on the preceding frame image in the above manner to perform the tracking.

Two processing methods: geometric pattern matching and color pattern matching are used in the pattern matching process used as the human body detection method in the first embodiment. Known methods are available for the geometric pattern matching and the color pattern matching. For example, a process disclosed in Kunimitsu, Asama, Kawabata, & Mishima (2004) "Detection of Object under Outdoor Environment with Binary Edge Image for Template" IEEJ Trans, EIS, Vol. 124, No. 2 may be used as the geometric pattern matching. For example, a method of finding the correlation between color histograms in the rectangle of a tracking frame corresponding to a human body may be used as the color pattern matching.

The tracking unit 102 of the first embodiment sets the tracking area of the human body when the association succeeded after the human body is detected using the geometric pattern matching as the human body detection method as a high-reliability tracking area. Since it is considered that the human body to be tracked is likely to exist in the tracking area of the human body for which the association succeeded using the geometric pattern matching, the tracking area of the human body for which the association succeeded using the geometric pattern matching is set as the high-reliability tracking area indicating a high reliability. In addition, the tracking unit 102 sets the tracking area of the human body when the association succeeded after the human body is detected using the color pattern matching as the human body detection method as a medium-reliability tracking area. Since the human body to be tracked is less likely to exist in the tracking area of the human body for which the association succeeded using the color pattern matching, compared with that in the geometric pattern matching, the tracking area of the human body for which the association succeeded using the color pattern matching is set as the medium-reliability tracking area indicating a medium reliability. The tracking unit 102 determines the human body ID of the human body for which the association failed by calculating the tracking position on the concerned frame image (the current frame image) using an average velocity vector calculated from the locus to the preceding frame in time series order. The tracking unit 102 sets the tracking area detected from the concerned frame image when the association failed as a low-reliability tracking area. Since the human body to be tracked is less likely to exist in the tracking area detected from the concerned frame image using the average velocity vector, compared with that in the color pattern matching, the tracking area detected from the concerned frame image using the average velocity vector is set as the low-reliability tracking area indicating a low reliability.

Although the example is described in the first embodiment in which an object is detected using the background subtraction method, the method of detecting an object is not limited to the background subtraction method and another method may be used as long as an object is capable of being detected from an image using the method. The method of detecting a human body from an image is not limited to the pattern matching process and another method may be used as long as a human body is capable of being detected from an image using the method. In addition, the detection of a human body is not limitedly performed in the local area where the object is detected and the detection of a human body may be performed in the entire image. Furthermore, the detection target object is not limited to the human body and may be any object capable of being detected as a specific object (for example, an object having a specific feature or an object determined to have a specific pattern). For example, the detection target object may be an automobile or an animal.

After Step S206, the process goes to Step S300 to perform correction of the shift of the tracking position. The correction of the shift of the tracking position in Step S300 is performed by the locus analyzing unit 103, the locus smoothing unit 104, and the tracking position correcting unit 105. After Step S300, the process goes to Step S207. In Step S207, the tracking unit 102 increments the variable i. Then, the process goes back to Step S205.

Figure 3:
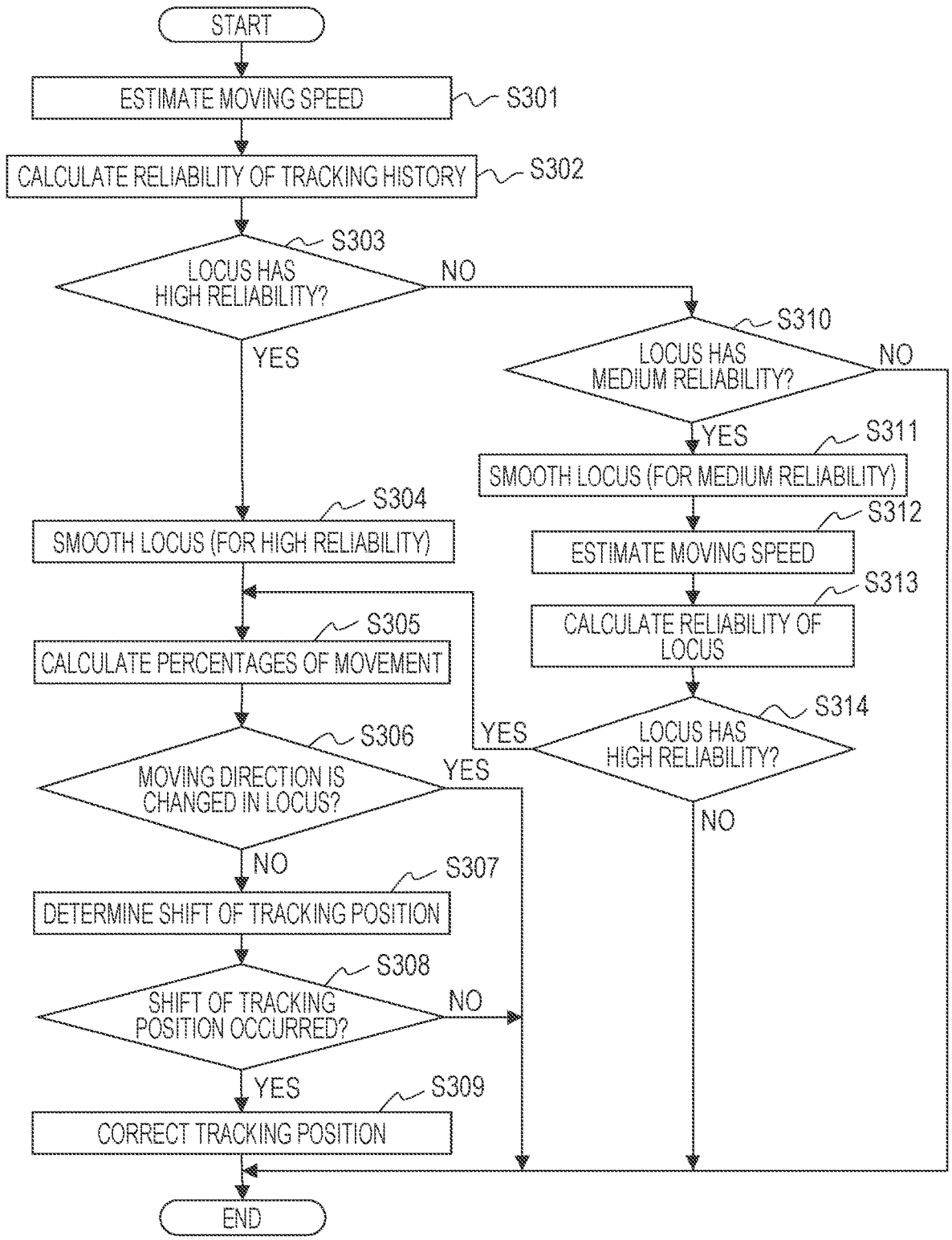
FIG. 3 is a flowchart illustrating an example of a process of correcting a shift of a tracking position in the first embodiment.

FIG. 3 is a flowchart illustrating an example of a detailed process of correcting the shift of the tracking position in Step S300.

Referring to FIG. 3, in Step S301, the locus analyzing unit 103 estimates a moving speed of the human body, which has been detected in the above manner. The estimation of the moving speed is performed using only the high-reliability tracking areas in the locus in the first embodiment. Here, for description, it is assumed that the human body i is being tracked. The high-reliability tracking area corresponding to the human body i is denoted by $R^i(k)$ and the high-reliability tracking area temporally adjacent to the high-reliability tracking area $R^i(k)$ is denoted by $R^i(k+1)$. The central coordinate of the high-reliability tracking area $R^i(k)$ is denoted by $(R^i_x(k), R^i_y(k))$ and the central coordinate of the high-reliability tracking area $R^i(k+1)$ is denoted by $(R^i_x(k+$ 1), $R^i_y(k+1)$). In the representations, $k=(1, 2, \ldots, K)$ and k is the ID added to the frame image to which the high-reliability tracking area in the locus of the human body i belongs. The frame images are arranged in order of time and the IDs are added to the frame images in chronological order of their timestamps. The velocity vector of the k-th high-reliability tracking area $R^i(k)$ is denoted by Equation (1). In Equation (1), Δt denotes the time interval between the timestamp of the frame image to which the high-reliability tracking area $R^i(k)$ belongs and the timestamp of the frame image to which the high-reliability tracking area $R^i(k+1)$ belongs.

$$V^i = (V^i_x, (k), V^i_y(k)) = \frac{\{(R^i_x(k+1), R^i_y(k+1)) - (R^i_x(k), R^i_y(k))\}}{\Delta t} \quad (1)$$

The average velocity vector of the human body i is calculated according to Equation (2):

$$\overline{V^i} = \left(\frac{1}{k}\right)\sum_{K=1}^{K}(V^i_k) = (V^i_x, V^i_y) \quad (2)$$

In Step S302, the locus analyzing unit 103 calculates the reliability of the tracking history. In Step S303, the locus analyzing unit 103 determines the reliability of the tracking history based on the reliability of each tracking position composing the tracking history. The reliability of each tracking position is the reliability of the tracking area. The tracking area is classified into the high-reliability tracking area, the medium-reliability tracking area, and the low-reliability tracking area, described above, in the first embodiment. In addition, the reliabilities of the tracking areas are determined based on the detection method (the geometric pattern matching or the color pattern matching) used in the detection of the human body (that is, the detection of the position of the tracking area), as described above. In other words, the locus analyzing unit 103 determines the reliability of the tracking history based on the detection method when the respective tracking positions of the human body, which compose the tracking history of the human body to be tracked, are detected.

Specifically, the locus analyzing unit 103 classifies the reliability of the tracking history of the human body i that is being tracked into a high-reliability locus, a medium-reliability locus, or a low-reliability locus based on the ratio of the number of the high-reliability tracking areas (the number of the tracking positions having a certain reliability) to the number of the tracking areas in the locus. For example, when the total number of the tracking areas composing the locus is 100 and the number of the high-reliability tracking areas is 70, the ratio of the number of the high-reliability tracking areas is 0.7.

The locus analyzing unit 103 determines whether the locus is the high-reliability locus based on the ratio of the number of the high-reliability tracking areas to the number of the tracking areas in the locus in Step S303. In the first embodiment, the locus analyzing unit 103 determines that the locus is the high-reliability locus if a condition is met in which the ratio of the number of the high-reliability tracking areas to the number of the tracking areas in the locus is higher than or equal to a high-reliability determination threshold value. If the locus analyzing unit 103 determines that the locus is determined to be the high-reliability locus (YES in Step S303), the process goes to Step S304. If the locus analyzing unit 103 determines that the locus is not the high-reliability locus (NO in Step S303), the process goes to Step S310.

In Step S304, the locus smoothing unit 104 performs locus smoothing to the high-reliability locus to create a smoothing tracking history. The locus smoothing for the high-reliability locus is varied depending on the reliabilities of the tracking areas in the locus and the positional relationship between the tracking areas.

The locus smoothing unit 104 does not perform the smoothing to the high-reliability tracking area included in the high-reliability locus. In contrast, the locus smoothing unit 104 performs the smoothing to the medium-reliability tracking area and the low-reliability tracking area included in the high-reliability locus in different manners for different four types: from Type 1 to Type 4 illustrated in FIG. 4. The tracking areas are classified into the four types based on their reliabilities and the positional relationship between the tracking areas. Each white circle in FIG. 4 indicates the tracking area of the human body detected from the local area including the object (local detection (LD)). Such a tracking area is referred to as an LD tracking area, which is the high-reliability tracking area. Each black circle in FIG. 4 indicates the tracking area of the human body detected from the frame image. Such a tracking area is referred to as a non-LD tracking area, which is the medium-reliability tracking area or the low-reliability tracking area. The classification into the four types: Type 1 to Type 4 is performed to the tracking area (the non-LD tracking area) indicated by the black circle in FIG. 4, which is the medium-reliability tracking area or the low-reliability tracking area. Each hatched circle in FIG. 4 indicates the tracking area after the locus smoothing (a smoothed tracking area).

In the first embodiment, the tracking area that is detected from the concerned frame image and that is classified into Type 1 is a tracking area that is not a high-reliability tracking area on the frame image immediately before the concerned frame image and is a high-reliability tracking area on the frame image immediately after the concerned frame image. The tracking area that is classified into Type 2 is a tracking area that is a high-reliability tracking area on the frame image immediately before the concerned frame image and is not a high-reliability tracking area on the frame image immediately after the concerned frame image. The tracking area that is classified into Type 3 is a tracking area that is a high-reliability tracking area on the frame images immediately before and immediately after the concerned frame image. The tracking area that is classified into Type 4 is a tracking area that is not a high-reliability tracking area on the frame images immediately before and immediately after the concerned frame image.

Figure 4:
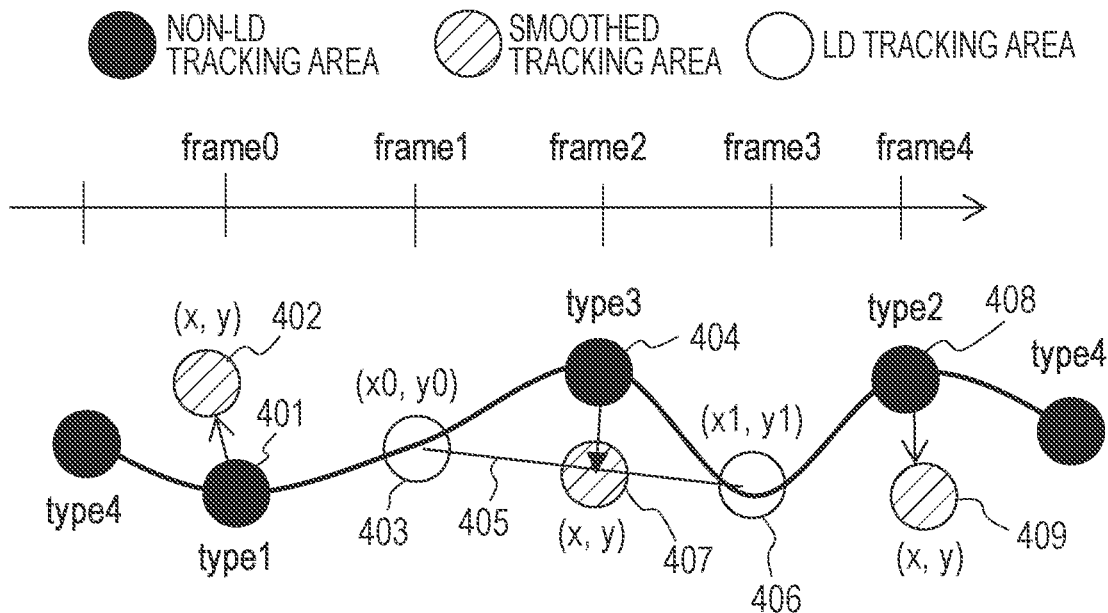
FIG. 4 is a diagram used for description of an example of smoothing of a locus.

How the tracking areas of Type 1 to Type 4 are smoothed by the locus smoothing unit 104 of the first embodiment will now be described with reference to FIG. 4.

In the smoothing of a tracking area 401 of Type 1, the locus smoothing unit 104 uses a high-reliability tracking area 403 on the frame image immediately after the concerned frame as a reference tracking area. The locus smoothing unit 104 moves the tracking area 401 of Type 1 to a position calculated based on the average velocity vector calculated in Step S301 and the time between the concerned frame (frame 0) and the immediately subsequent frame (frame 1). At this time, the locus smoothing unit 104 identifies a correction line segment, for example, which is parallel to the direction indicated by the average velocity vector and that passes through the position of the high-reliability tracking area 403. In addition, the locus smoothing unit 104 multiplies the speed indicated by the average velocity vector by the time between frame 0 and frame 1 to calculate the distance. Then, the locus smoothing unit 104 corrects the position of the tracking area 401 to a position on the identified correction line segment, which is apart from the position of the high-reliability tracking area 403 in a direction opposite to that of the average velocity vector by the calculated distance. In the example in FIG. 4, the tracking area to which the tracking area 401 of Type 1 is moved in the smoothing of the tracking area 401 of Type 1 is a smoothed tracking area 402. As described above, in the smoothing of the tracking area of Type 1, the locus smoothing unit 104 corrects a first tracking position (a first tracking area) of an object estimated in a first image in the following manner. Specifically, the locus smoothing unit 104 corrects the first tracking position of the object on the first image based on a second tracking position (a second tracking area) of the object on a second image, which is the subsequent frame of the first image in time series. The second tracking position has a reliability higher than that of the first tracking position.

In the smoothing of a tracking area 408 of Type 2, the locus smoothing unit 104 uses a high-reliability tracking area 406 on the frame image (frame 3) immediately before the concerned frame (frame 4) as the reference tracking area. The locus smoothing unit 104 moves the tracking area 408 of Type 2 to a position calculated based on the average velocity vector calculated in Step S301 and the time between the concerned frame (frame 4) and the immediately preceding frame (frame 3). At this time, the locus smoothing unit 104 identifies the correction line segment, for example, which is parallel to the direction indicated by the average velocity vector and that passes through the position of the high-reliability tracking area 406. In addition, the locus smoothing unit 104 multiplies the speed indicated by the average velocity vector by the time between frame 3 and frame 4 to calculate the distance. Then, the locus smoothing unit 104 corrects the position of the tracking area 408 to a position on the identified correction line segment, which is apart from the position of the high-reliability tracking area 406 in the direction indicated by the average velocity vector by the calculated distance. In the example in FIG. 4, the tracking area to which the tracking area 408 of Type 2 is moved in the smoothing of the tracking area 408 of Type 2 is a smoothed tracking area 409. As described above, in the smoothing of the tracking area of Type 2, the locus smoothing unit 104 corrects the first tracking position (the first tracking area) of an object estimated on the first image in the following manner. Specifically, the locus smoothing unit 104 corrects the first tracking position of the object on the first image based on the second tracking position (the second tracking area) of the object on the second image, which is the preceding frame of the first image in time series. The second tracking position has a reliability higher than that of the first tracking position. As described above in Type 1 to Type 2, the locus smoothing unit 104 corrects the first tracking position of the object on the first image based on the second tracking position of the object on the second image, which is captured at a time different from that of the first image. The second tracking position has a reliability higher than that of the first tracking position.

In the smoothing of a tracking area 404 of Type 3, the locus smoothing unit 104 determines a line segment 405 both ends of which are the high-reliability tracking areas 403 and 406 on the frame images immediately before and immediately after the concerned frame. Next, the locus smoothing unit 104 calculates a position on the line segment 405, which is distributed at a ratio corresponding to the time between the concerned frame to which the tracking area 404 of Type 3 belongs and the immediately preceding frame and the time between the concerned frame and the immediately subsequent frame. Then, the locus smoothing unit 104 moves the tracking area 404 of Type 3 to the position distributed on the line segment 405. In the example in FIG. 4, the tracking area to which the tracking area 404 of Type 3 is moved in the smoothing of the tracking area 404 of Type 3 is a smoothed tracking area 407. As described above, in the smoothing of the tracking area of Type 3, the locus smoothing unit 104 corrects the first tracking position (the first tracking area) of an object estimated on the first image in the following manner. Specifically, the locus smoothing unit 104 corrects the first tracking position of the object on the first image based on each of the tracking positions of the object on the second image, which is the preceding frame of the first image in time series, and a third image, which is the subsequent frame of the first image in time series. The tracking positions have reliabilities higher than that of the first tracking position.

The tracking area after the medium-reliability tracking area or the low-reliability tracking area is smoothed in the above manner is subsequently processed as the high-reliability tracking area. Upon termination of the smoothing of the high-reliability locus described above, the process goes to Step S305. Step S305 and the subsequent steps are described below.

If the locus analyzing unit 103 determines that the locus does not meet the condition of the high-reliability locus (NO in Step S303), in Step S310, the locus analyzing unit 103 determines whether the locus is the medium-reliability locus. The locus analyzing unit 103 determines that the locus is the medium-reliability locus when a condition is met in which the ratio of the number of the high-reliability tracking areas to the number of the tracking areas in the locus is, for example, higher than or equal to a medium-reliability determination threshold value (higher than or equal to the medium-reliability determination threshold value and lower than the high-reliability determination threshold value). If the locus analyzing unit 103 determines that the locus is the medium-reliability locus (YES in Step S310), the process goes to Step S311, which is performed by the locus smoothing unit 104. If the locus analyzing unit 103 determines that the locus is not the medium-reliability locus (NO in Step S310), that is, if the locus analyzing unit 103 determines that the locus is the low-reliability locus, the correction of the shift of the tracking position in Step S300 is terminated and the process goes to Step S207 in FIG. 2.

In Step S311, the locus smoothing unit 104 performs the locus smoothing to the medium-reliability locus. The locus smoothing of the medium-reliability locus is performed to only the tracking areas classified into Type 1 and Type 2 described above, among the tracking areas included in the medium-reliability locus. The tracking area smoothed in the locus smoothing of the medium-reliability locus is subsequently processed as the high-reliability tracking area, as in the locus smoothing of the high-reliability locus in Step S304.

In Step S312, the locus smoothing unit 104 re-estimates the moving speed estimated in Step S301. The estimation method in Step S312 is the same as the method of estimating the moving speed in Step S301.

In Step S313, the locus smoothing unit 104 re-calculates the reliability of the locus subjected to the locus smoothing in Step S311 (the reliability of the tracking locus).

In Step S314, the locus smoothing unit 104 determines whether the locus is the high-reliability locus (that is, the locus is made the high-reliability locus in the locus smoothing in Step S311). If the locus smoothing unit 104 determines that the locus is the high-reliability locus (YES in Step S314), the process goes back to Step S305, which is performed by the tracking position correcting unit 105. If the locus smoothing unit 104 determines that the locus is not the high-reliability locus (NO in Step S314), the correction of the shift of the tracking position in Step S300 is terminated and the process goes to Step S207 in FIG. 2.

In Step S305, the tracking position correcting unit 105 measures the change in the moving direction in the smoothing tracking history created by the locus smoothing unit 104. In Step S306, the tracking position correcting unit 105 determines the degree of stability of the locus based on the change in the moving direction. The degree of stability of the locus indicates the degree of change in the moving direction of the object to be tracked. The degree of change in the moving direction of the object to be tracked is decreased as the degree of stability is increased, and the degree of change in the moving direction of the object to be tracked is increased as the degree of stability is decreased. Specifically, in Step S305, the tracking position correcting unit 105 calculates the percentage of movement in the positive direction and the percentage of movement in the negative direction for the x direction and the y direction in order to digitize the degree of change in the moving direction in the locus. The calculation of the percentages of movement is performed using the average velocity vector calculated in Step S301. For example, when the number of the high-reliability tracking areas included in the locus is 70 and the number of the velocity vectors each having an element in the positive direction in the x direction is seven, the percentage of movement in the positive direction in the x direction is 10% and the percentage of movement in the negative direction in the x direction is 90%.

In Step S306, the tracking position correcting unit 105 determines whether the moving direction is changed in the locus. In the first embodiment, the tracking position correcting unit 105 determines that the moving direction is not changed if the percentage of movement in the positive direction or the negative direction is higher than or equal to a predetermined value in each of the x direction and the y direction. In other words, the tracking position correcting unit 105 determines that the degree of stability of the moving direction of the object is higher than a predetermined threshold value because the moving direction of the object to be tracked is stable. For example, when the predetermined value is 80%, the number of the high-reliability tracking areas is 70, and 63 velocity vectors each having an element in the positive direction in the x direction exist, the percentage of movement in the positive direction is 90%. Accordingly, the tracking position correcting unit 105 determines that "the moving direction is not changed in the x direction." Here, the remaining seven velocity vectors each have an element in the negative direction or each have a value indicating a static state in the x direction. The tracking position correcting unit 105 determines whether the moving direction is changed in the locus also in the y direction. If the tracking position correcting unit 105 determines that the moving direction is changed in both the x direction and the y direction (YES in Step S306), the correction of the shift of the tracking position in Step S300 is terminated and the process goes to Step S207 in FIG. 2. If the tracking position correcting unit 105 determines that the moving direction is not changed in at least one of the x direction and the y direction (NO in Step S306), that is, if the degree of stability is higher than the predetermined threshold value in at least one of the x direction and the y direction, the process goes to Step S307.

In Step S307, the tracking position correcting unit 105 determines the shift of the tracking position on the last frame image that is currently being processed. Although the definition of the shift of the tracking position and the method of determining the shift of the tracking position are capable of arbitrarily determined depending on a use case or the like, a case is defined as the shift of the tracking position in the first embodiment in which movement in a direction opposite to the average movement direction calculated from the locus occurs.

The method of determining the shift of the tracking position based on the definition of the shift of the tracking position will now be described.

In the first embodiment, the tracking position correcting unit 105 separately determines the shift of the tracking position in the following three cases: Case 1 to Case 3. Case 1 of the shift of the tracking position is a case in which the moving direction is not changed in both the x direction and the y direction. Case 2 of the shift of the tracking position is a case in which the moving direction is not changed only in the y direction (the moving direction is changed in the x direction). Case 3 of the shift of the tracking position is a case in which the moving direction is not changed only in the x direction (the moving direction is changed in the y direction).

Figure 5:
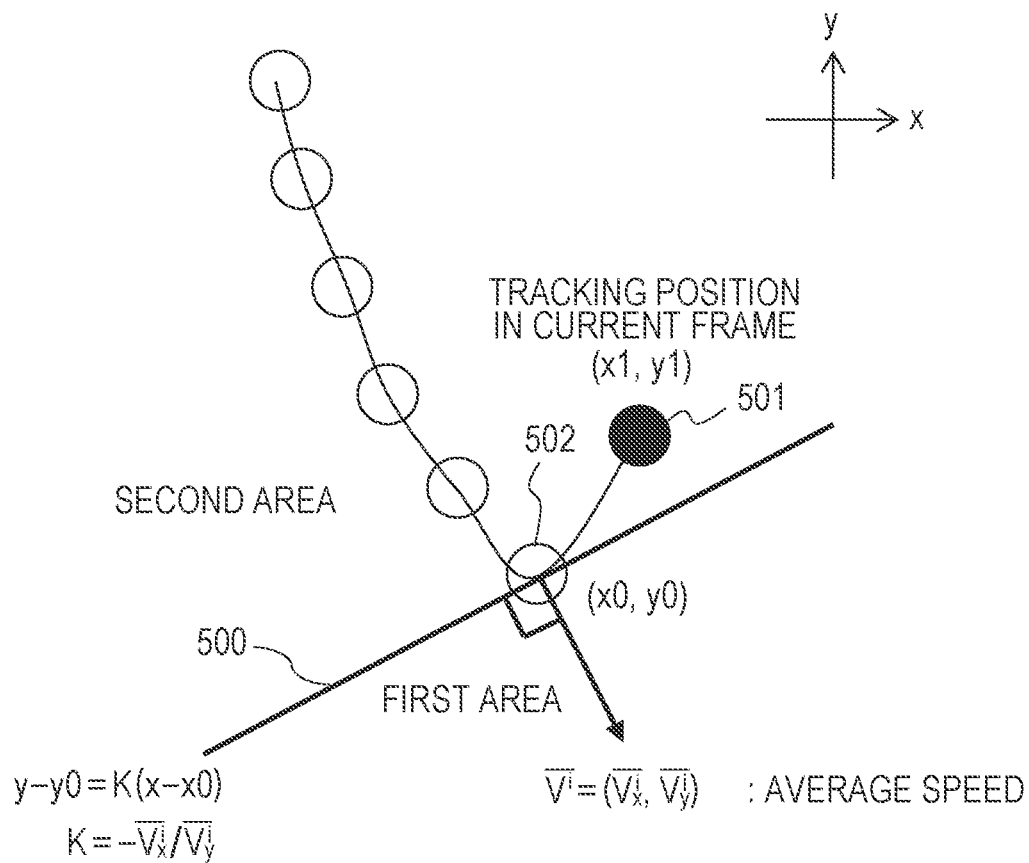
FIG. 5 is an explanatory diagram of determination of the shift of the tracking position (Case 1)

First, Case 1 of the shift of the tracking position, in which the moving direction is not changed in both the x direction and the y direction, will be described with reference to FIG. 5. First, the tracking position correcting unit 105 calculates the center point of a tracking area 502 on the preceding frame image of a tracking area 501 (the tracking area i) focused on the concerned frame image. Next, the tracking position correcting unit 105 sets a tracking position shift determination line 500. The tracking position shift determination line 500 in Case 1 is a straight line that passes through the center point calculated for the tracking area 502 and that is orthogonal to the average velocity vector estimated in Step S301 or Step S312. In the first embodiment, the area in the positive direction of the average velocity vector with respect to the tracking position shift determination line 500 is referred to as a first area for convenience and the area in the negative direction of the average velocity vector with respect to the tracking position shift determination line 500 is referred to as a second area for convenience. If the center point of the tracking area 501 (the tracking area i) is included in the second area, the tracking position correcting unit 105 determines that the shift of the tracking position occurs in the tracking area 501 (the tracking area i).

Next, Case 2 of the shift of the tracking position, in which the moving direction is not changed only in the y direction, will be described with reference to FIG. 6. First, the tracking position correcting unit 105 calculates the center point of a tracking area 602 on the preceding frame image of a tracking area 601 (the tracking area i) focused on the concerned frame image. Next, the tracking position correcting unit 105 sets a tracking position shift determination line 600. The tracking position shift determination line 600 in Case 2 is a straight line that passes through the center point calculated for the tracking area 602 and that is parallel to the x direction. In the first embodiment, the area in the positive direction of the y-direction element of the average velocity vector with respect to the tracking position shift determination line 600 is referred to as the first area for convenience and the area in the negative direction of the y-direction element of the average velocity vector with respect to the tracking position shift determination line 600 is referred to as the second area for convenience. If the center point of the tracking area 601 (the tracking area i) is included in the second area, the tracking position correcting unit 105 determines that the shift of the tracking position occurs in the tracking area 601 (the tracking area i).

Next, Case 3 of the shift of the tracking position, in which the moving direction is not changed only in the x direction, will be described with reference to FIG. 7. First, the tracking position correcting unit 105 calculates the center point of a tracking area 702 on the preceding frame image of a tracking area 701 (the tracking area i) focused on the concerned frame image. Next, the tracking position correcting unit 105 sets a tracking position shift determination line 700. The tracking position shift determination line 700 in Case 3 is a straight line that passes through the center point calculated for the tracking area 702 and that is parallel to the y direction. In the first embodiment, the area in the positive direction of the x-direction element of the average velocity vector with respect to the tracking position shift determination line 700 is referred to as the first area for convenience and the area in the negative direction of the x-direction element of the average velocity vector with respect to the tracking position shift determination line 700 is referred to as the second area for convenience. If the center point of the tracking area 701 (the tracking area i) is included in the second area, the tracking position correcting unit 105 determines that the shift of the tracking position occurs in the tracking area 701 (the tracking area i).

After the determination of the shift of the tracking position in Step S307, in Step S308, the tracking position correcting unit 105 branches the process depending on whether the shift of the tracking position occurs. If the tracking position correcting unit 105 determines that the shift of the tracking position occurred (YES in Step S308), the process goes to Step S309. If the tracking position correcting unit 105 determines that the shift of the tracking position did not occur (NO in Step S308), the correction of the shift of the tracking position in Step S300 is terminated.

In Step S309, the tracking position correcting unit 105 corrects the tracking position on the last frame image that is currently being processed. Although the method of correcting the tracking position is capable of arbitrarily determined depending on the use case or the like, the tracking position is corrected in the following different manners for the different cases of the shift of the tracking position, described above, in the first embodiment.

Figure 8:
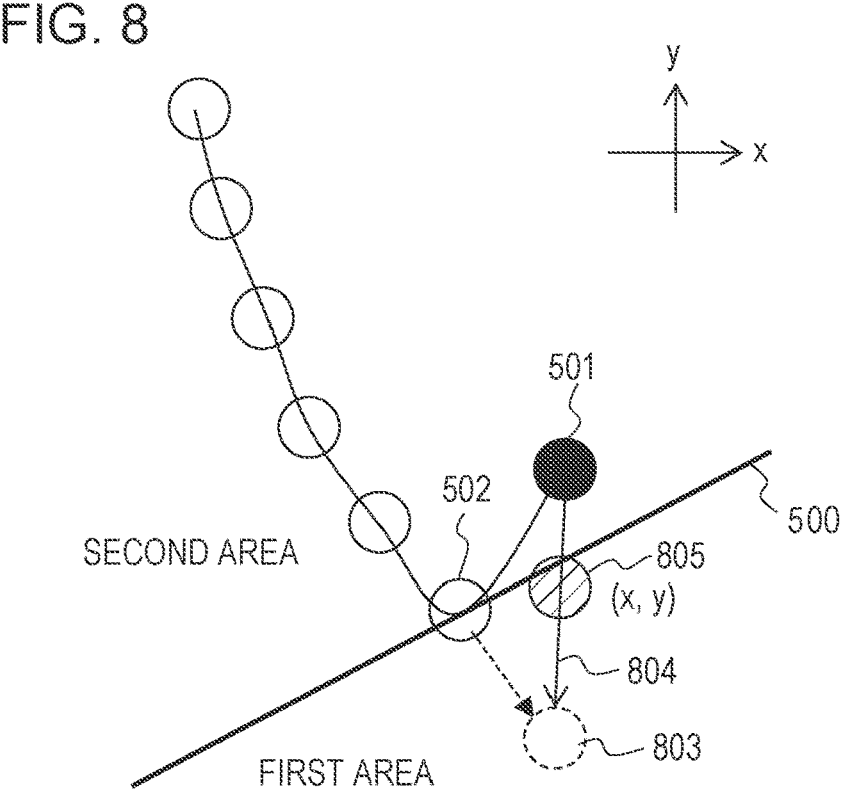
FIG. 8 is an explanatory diagram of correction of the shift of the tracking position (Case 1)

The correction of the tracking position in Case 1 of the shift of the tracking position, in which the moving direction is not changed in both the x direction and the y direction, will be described with reference to FIG. 8. The same reference numerals are used in FIG. 8 to identify the same components in FIG. 5. First, the tracking position correcting unit 105 calculates an estimated moving position (an estimated tracking area 803) of the tracking area 501 on the concerned frame image using the center point of the tracking area 502 and the average velocity vector on the preceding frame image of the concerned frame. Next, the tracking position correcting unit 105 sets a straight line 804 connecting the center point of the tracking area 501 on the concerned frame to the center point of the estimated tracking area 803 on the concerned frame and calculates the intersection between the straight line 804 and the tracking position shift determination line 500. Then, the tracking position correcting unit 105 sets a point moved from the intersection on the straight line 804 in the direction toward the first area by several pixels as the position (the center point) of a corrected tracking area 805.

Figure 9:
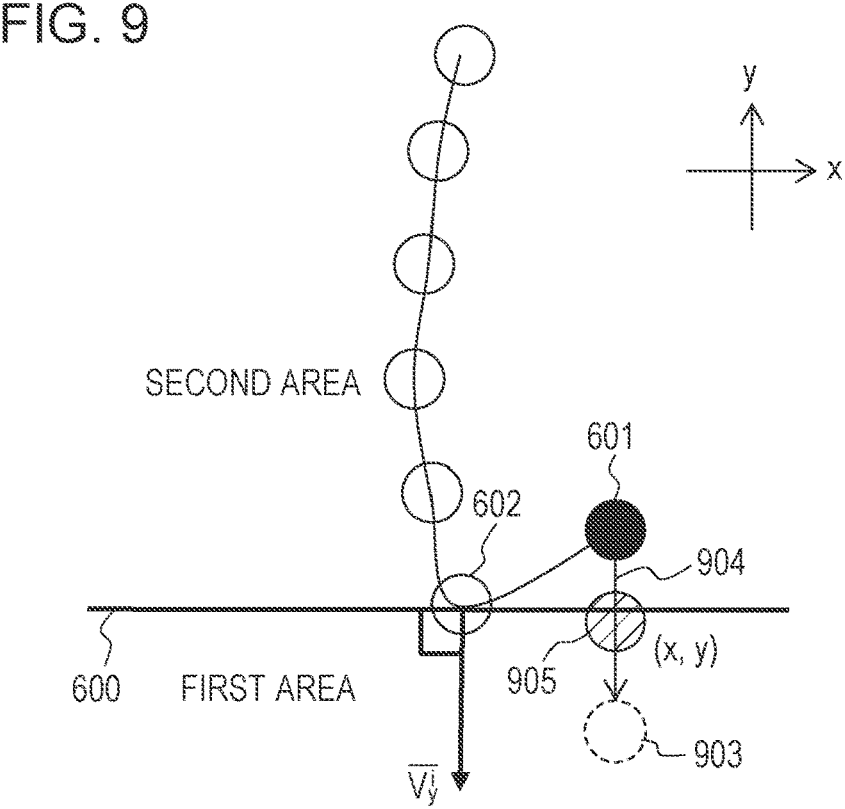
FIG. 9 is an explanatory diagram of correction of the shift of the tracking position (Case 2)

Next, the correction of the tracking position in Case 2 of the shift of the tracking position, in which the moving direction is not changed only in the y direction, will be described with reference to FIG. 9. The same reference numerals are used in FIG. 9 to identify the same components in FIG. 6. First, the tracking position correcting unit 105 calculates the estimated moving position (an estimated tracking area 903) of the tracking area 601 on the concerned frame image using the center point of the tracking area 602 and the y component of the average velocity vector on the preceding frame image of the concerned frame. Next, the tracking position correcting unit 105 sets a straight line 904 connecting the center point of the tracking area 601 to the center point of the estimated tracking area 903 on the concerned frame and calculates the intersection between the straight line 904 and the tracking position shift determination line 600. Then, the tracking position correcting unit 105 sets a point moved from the intersection on the straight line 904 in the direction toward the first area by several pixels as the position (the center point) of a corrected tracking area 905.

Figure 10:
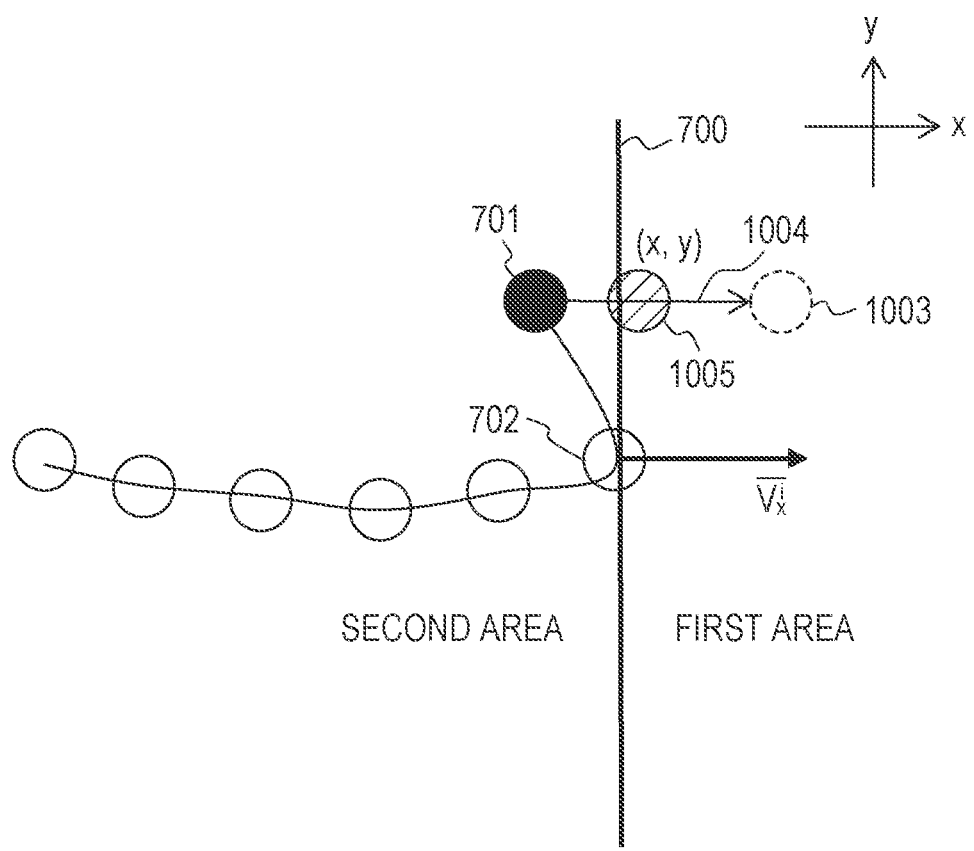
FIG. 10 is an explanatory diagram of correction of the shift of the tracking position (Case 3)

Next, the correction of the tracking position in Case 3 of the shift of the tracking position, in which the moving direction is not changed only in the x direction, will be described with reference to FIG. 10. The same reference numerals are used in FIG. 10 to identify the same components in FIG. 7. First, the tracking position correcting unit 105 calculates the estimated moving position (an estimated tracking area 1003) of the tracking area 701 on the concerned frame image using the center point of the tracking area 702 and the x component of the average velocity vector on the preceding frame image of the concerned frame. Next, the tracking position correcting unit 105 sets a straight line 1004 connecting the center point of the tracking area 701 to the center point of the estimated tracking area 1003 on the concerned frame and calculates the intersection between the straight line 1004 and the tracking position shift determination line 700. Then, the tracking position correcting unit 105 sets a point moved from the intersection on the straight line 1004 in the direction toward the first area by several pixels as the position (the center point) of a corrected tracking area 1005.

After the correction of the tracking position in Step S309, the correction of the shift of the tracking position in Step S300 is terminated and the process goes to Step S207 in FIG. 2.

As described above, the image processing apparatus 100 of the first embodiment calculates the reliability of the tracking history of the tracking target object (a tracking target human body) and smoothes the tracking history based on the reliability of the tracking history to correct the shift of the tracking position. Consequently, according to the first embodiment, it is possible to correct the shift of the tracking position without the loss of the minute information about the locus in the detection and tracking of the human body in the image.

The image processing apparatus 100 of the first embodiment may have a configuration in which, if the shift of the tracking position occurs, the output from the output unit 106 is changed so that the user is capable of knowing the area where the shift of the tracking position occurs to present the change to the user. For example, when the tracking frame of the human body is output on the screen of a display device (not illustrated), the output unit 106 may change the color of the tracking frame to a certain color or may adjust the width of the frame line for the area where the shift of the tracking position occurs to present the occurrence of the shift of the tracking position to the user. Alternatively, if the shift of the tracking position occurs, the output unit 106 may continue displaying of the change of the output for a predetermined time. In this case, the output unit 106 may stop the presentation after a predetermined time elapsed.

Second Embodiment

A second embodiment will now be described.

The example is described above in the first embodiment in which the correction of the shift of the tracking position is performed without any condition. In the second embodiment, a method of correcting the shift of the tracking position only when a predetermined condition is met will be described. A case will be described here in which the predetermined condition is "the number of detected human bodies is smaller than a predetermined number."

The configuration of the image processing apparatus 100 of the second embodiment is the same as that in FIG. 1 described above.

Figure 11:
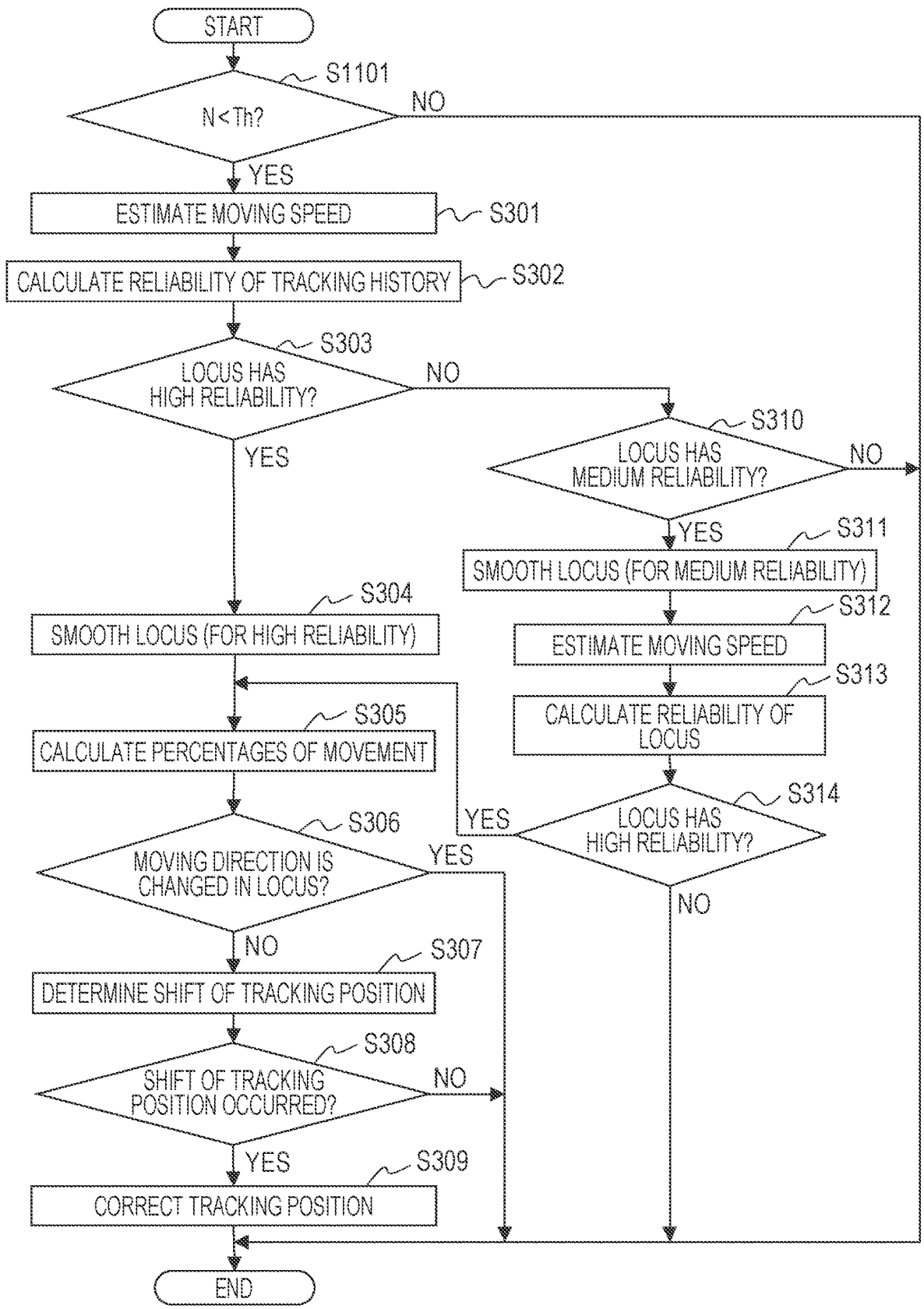
FIG. 11 is a flowchart illustrating an example of a process of correcting the shift of the tracking position in a second embodiment.

FIG. 11 is a flowchart illustrating an example of the process of correcting the shift of the tracking position in Step S300 in the second embodiment. The following description focuses on the difference from the first embodiment for simplicity. The same reference numerals are used in FIG. 11 to identify the steps in which the same processing as in the steps used in the first embodiment is performed. A description of such steps is omitted herein.

Referring to FIG. 11, in Step S1101, the tracking position correcting unit 105 determines whether a number-of-detected-human-bodies N is lower than a predetermined threshold value (Th). If the tracking position correcting unit 105 determines that the number-of-detected-human-bodies N is lower than the predetermined threshold value Th (YES in Step S1101), the process goes to Step S301. If the tracking position correcting unit 105 determines that the number-of-detected-human-bodies N is not lower than the predetermined threshold value Th (NO in Step S1101), the correction of the shift of the tracking position in Step S300 is terminated.

As described above, the image processing apparatus 100 of the second embodiment performs the correction of the shift of the tracking position only if the number of detected human bodies is smaller than a predetermined number (lower than a threshold value). Consequently, according to the second embodiment, it is possible to track the human bodies without increasing the calculation load while keeping the accuracy in the case of the tracking of human bodies of a small number in which the shift of the tracking position is relatively difficult to occur.

Third Embodiment

A third embodiment will now be described.

A method of correcting the shift of the tracking position only when a predetermined condition is met will be described in the third embodiment, as in the second embodiment. A case will be described here in which the predetermined condition is "the color or the texture of the tracking target human body is not similar to that of a neighboring area."

The configuration of the image processing apparatus 100 of the third embodiment is the same as that in FIG. 1 described above.

Figure 12:
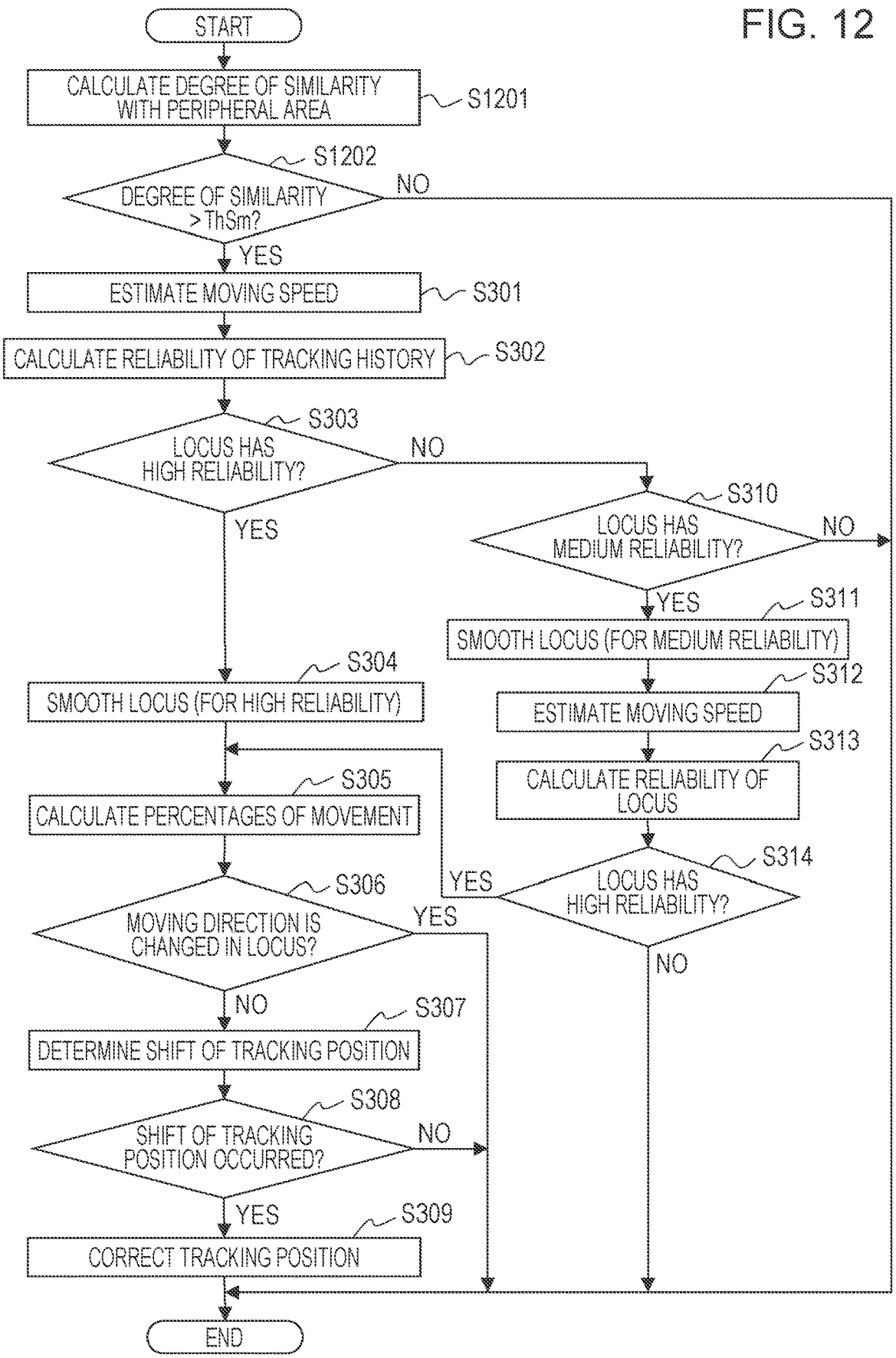
FIG. 12 is a flowchart illustrating an example of a process of correcting the shift of the tracking position in a third embodiment.

FIG. 12 is a flowchart illustrating an example of the process of correcting the shift of the tracking position in Step S300 in the third embodiment. The following description focuses on the difference from the first embodiment for simplicity. The same reference numerals are used in FIG. 12 to identify the steps in which the same processing as in the steps used in the above embodiments is performed. A description of such steps is omitted herein.

Referring to FIG. 12, in Step S1201, the tracking position correcting unit 105 calculates the degree of similarity between the tracking area i and its peripheral area. In the third embodiment, the tracking position correcting unit 105 sets the peripheral area of the tracking area i as a rectangular search range. It is assumed here that the top left coordinate of the peripheral area is denoted by (lx, ty) and the bottom right coordinate of the peripheral area is denoted by (rx, by). It is also assumed that the top left coordinate of the frame image is the origin (0, 0), the direction from the left to the right on the screen is the positive direction in the x direction, and the direction from the top to the bottom on the screen is the positive direction in the y direction. It is further assumed that the center coordinate of the tracking area i is denoted by (cx, cy), the width is denoted by w, the height is denoted by h, the width of the frame image is denoted by W, and the height of the frame image is denoted by H. In this case, lx=max (0, cx−w), rx=(min W, cx+w), ty=(max 0, cy−h), and by=min (H, cy+h).

Next, the tracking position correcting unit 105 defines the rectangular area having the same size as that of the tracking area i as a reference area and sets five reference areas on the frame image at random so that the center coordinate of each reference area is within the peripheral area and outside the tracking area.

Then, the tracking position correcting unit 105 calculates the degree of similarity between the tracking area i and each of the five reference areas using a predetermined similarity calculation formula. Any similarity calculation formula may be used as long as the similarity between the tracking area i and the reference area is capable of being digitized with the formula. In the third embodiment, color histogram intersection between the two areas is used. Specifically, the tracking position correcting unit 105 performs color subtraction of the color value of each area to a Nc color and, then, creates a histogram in each area. Then, the tracking position correcting unit 105 calculates the degree of similarity according to Equation (3) and Equation (4):

$$D=\Sigma_{c=0}^{Nc} \min(a_c, b_c) \tag{3}$$

$$S=D/N_p \tag{4}$$

In Equation (3) and Equation (4), c denotes the color index value, $a_c$ denotes the number of pixels each having the color index value c in one area, $b_c$ denotes the number of pixels each having the color index value c in the other area, $N_p$ denotes the total number of pixels in each area, and S denotes the degree of similarity between the two areas.

Referring back to FIG. 12, in Step S1202, the tracking position correcting unit 105 determines whether an area exists, in which a degree-of-similarity S calculated for each of the five reference areas is higher than a predetermined threshold value ThSm. If the tracking position correcting unit 105 determines that at least one area exists, in which the degree-of-similarity S calculated for each of the five reference areas is higher than the predetermined threshold value ThSm (YES in Step S1202), the process goes to Step S301. If the tracking position correcting unit 105 determines that no area exists, in which the degree-of-similarity S calculated for each of the five reference areas is higher than the predetermined threshold value ThSm (NO in Step S1202), the correction of the shift of the tracking position in Step S300 is terminated.

As described above, the image processing apparatus 100 of the third embodiment performs the correction of the shift of the tracking position when the area similar to the tracking area exists around the tracking area. Consequently, according to the third embodiment, it is possible to track the human bodies without increasing the calculation load while keeping the tracking accuracy when the shift of the tracking position is difficult to occur, for example, when the similarity between the tracking area and the background area is low.

Fourth Embodiment

A fourth embodiment will now be described.

The cases that are not involved in an operation by the user are described above in the first to third embodiments. A case is described in the fourth embodiment in which a user's operation is reflected in the correction of the shift of the tracking position.

Figure 13:
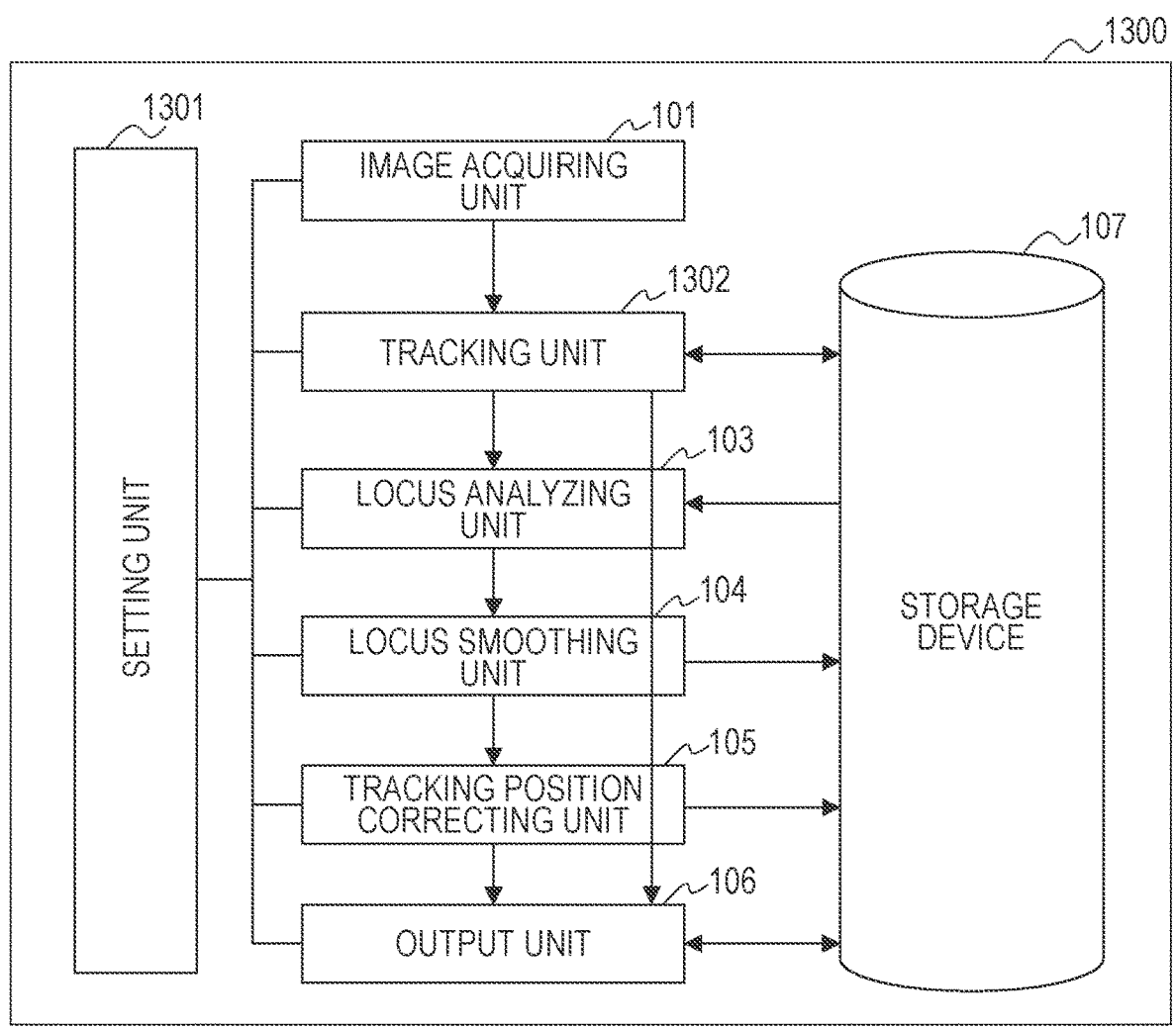
FIG. 13 is a block diagram illustrating an example of the configuration of an image processing apparatus of a fourth embodiment.
Figure 14:
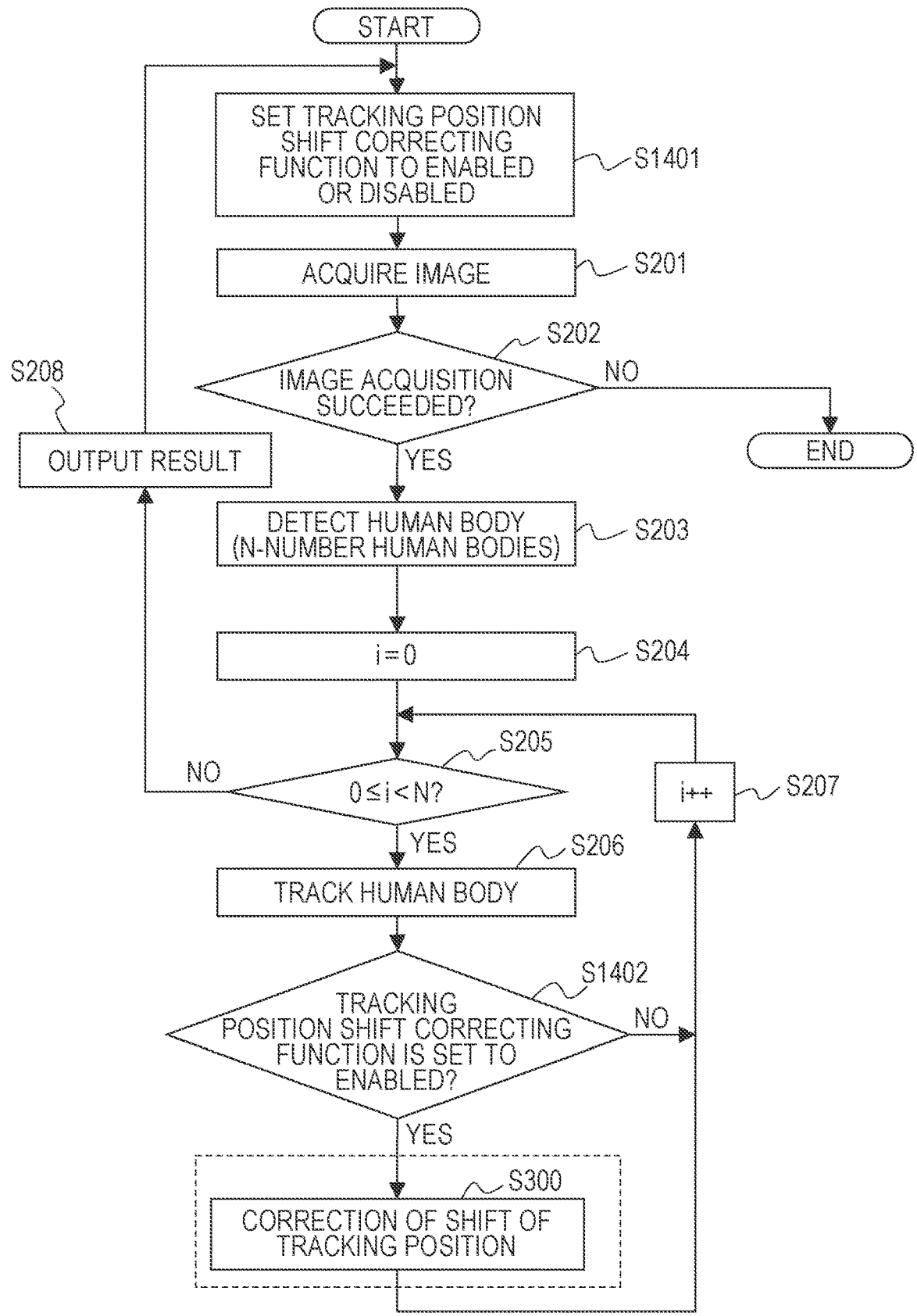
FIG. 14 is a flowchart illustrating an example of an image processing process in the image processing apparatus of the fourth embodiment.

FIG. 13 is a block diagram illustrating an example of the configuration of an image processing apparatus 1300 of the fourth embodiment. FIG. 14 is a flowchart illustrating an example of an image processing process in the image processing apparatus 1300 of the fourth embodiment. FIG. 14 illustrates a processing flow from the detection and tracking of an object (human body) to the correction of the shift of the tracking position. The following description focuses on the difference from the first embodiment for simplicity. The same reference numerals are used in FIG. 13 and FIG. 14 to identify the same components and steps as those described in the above embodiments. A description of such components and steps is omitted herein.

The image processing apparatus 1300 of the fourth embodiment differs from the image processing apparatus 100 illustrated in FIG. 1 in that a setting unit 1301 is added and in that the operation of a tracking unit 1302 is different from that of the tracking unit 102 in FIG. 1.

In the fourth embodiment, in Step S1401 in FIG. 14, the setting unit 1301 sets a tracking position shift correcting function to "enabled" or "disabled" depending on a user's operation. Information about the setting of the tracking position shift correcting function to "enabled" or "disabled" may be stored in a memory in the tracking unit 1302 or may be stored in the storage device 107. In the fourth embodiment, Step S1401 is performed by the setting unit 1301 only before the first image acquisition and when the user performs a specific operation with a user interface (not illustrated). The operation with the user interface is, for example, depression of a setting button on the screen or a certain key operation. The operation with the user interface is not limited to this and may be arbitrarily set if whether Step S1401 is performed is capable of being switched. For example, the setting unit 1301 may be configured so that Step S1401 is performed based on the result of audio acquisition from the user with a microphone and audio recognition. Alternatively, when the setting unit 1301 acquires a gesture of the user from a video camera as a moving picture or a still image and recognizes a certain gesture through recognition of the image, the setting unit 1301 may be configured so that Step S1401 is performed.

In Step S201, the image acquiring unit 101 performs the image acquisition. Steps S201 to S206 are the same as those in the first embodiment. In the fourth embodiment, Step S203 to Step S206 may be performed by the tracking unit 1302.

After Step S206, in Step S1402, the tracking unit 1302 determines whether the tracking position shift correcting function is set to "enabled" by the user. If the tracking unit 1302 determines that the tracking position shift correcting function is set to "enabled" by the user (YES in Step S1402), the process goes to Step S300. If the tracking unit 1302 determines that the tracking position shift correcting function is not set to "enabled" by the user (NO in Step S1402), Step S300 is not performed and the process goes to Step S207. The processing in Step S300 in any of the first to third embodiments described above is performed as the operation in Step S300.

As described above, the image processing apparatus 1300 of the fourth embodiment is configured so that the tracking position shift correcting function is capable of being set to "enabled" or "disabled" based on the user's operation. Consequently, according to the fourth embodiment, the user is capable of flexibly adjusting the balance between the accuracy and the computer load depending on the use case or the like.

Fifth Embodiment

A fifth embodiment will now be described.

The method of setting the tracking position shift correcting function with the user interface by the user is described in the fourth embodiment as an example in which the user's operation is reflected in the correction of the shift of the tracking position. A case is described in the fifth embodiment in which the user sets an object (human body) the shift of the tracking position of which is to be corrected with the user interface. The configuration of the image processing apparatus 1300 of the fifth embodiment is the same as that illustrated in FIG. 13.

Figure 15:
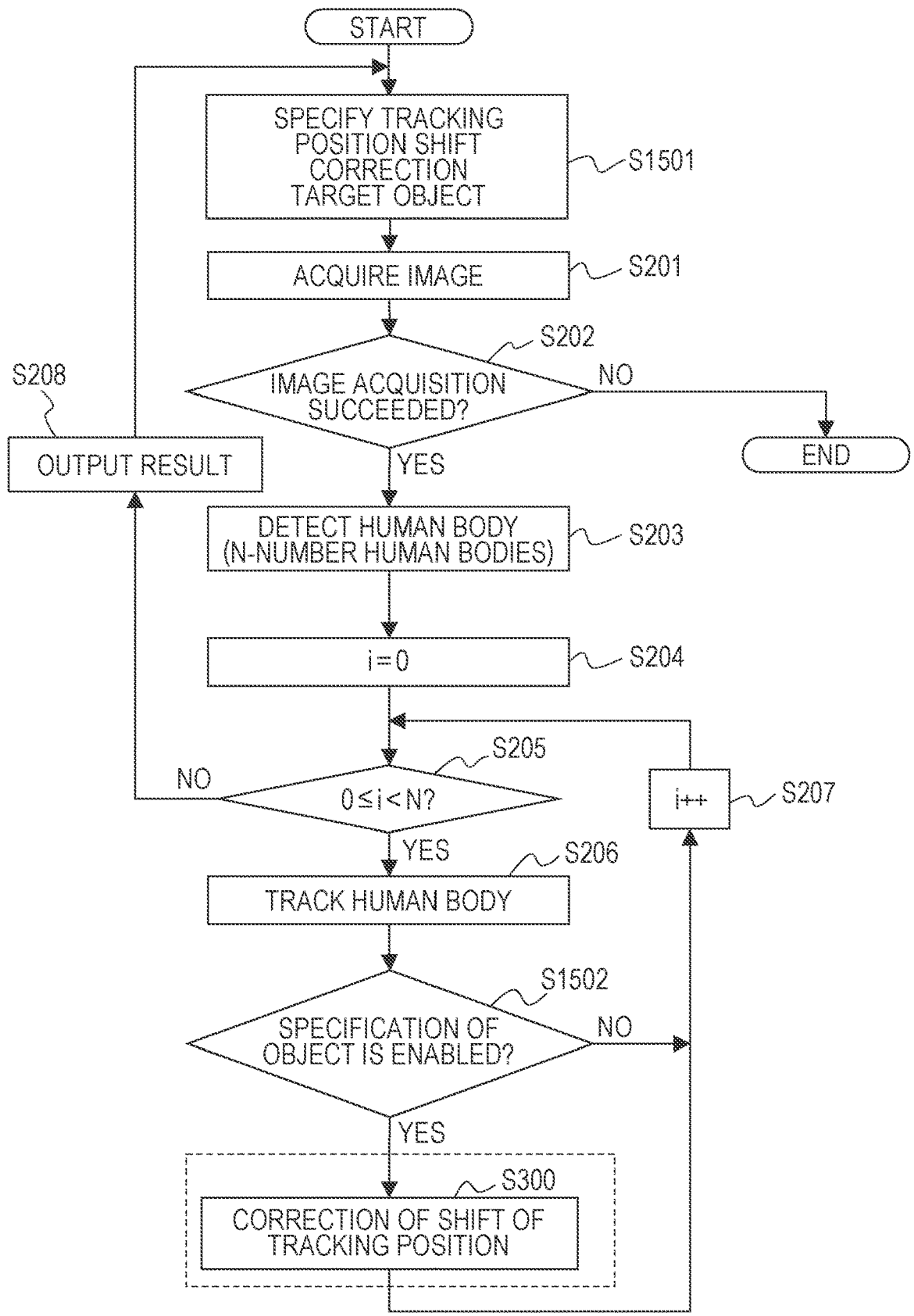
FIG. 15 is a flowchart illustrating an example of an image processing process in the image processing apparatus of a fifth embodiment.

FIG. 15 is a flowchart illustrating an example of an image processing process in the image processing apparatus 1300 of the fifth embodiment. FIG. 15 illustrates a processing flow from the detection and tracking of an object (human body) to the correction of the shift of the tracking position. The following description focuses on the difference from the first embodiment for simplicity. The same reference numerals are used in FIG. 15 to identify the same steps as those described in the above embodiments. A description of such steps is omitted herein.

Referring to FIG. 15, in Step S1501, the setting unit 1301 sets an object which is specified by the user with the user interface and the shift of the tracking position of which is to be corrected as a tracking position shift correction target object. The human body is tracked as the object also in the fifth embodiment, as in the above embodiments. Specification information about the object for which the correction of the shift of the tracking position is to be performed may be stored in the memory in the tracking unit 1302 or may be stored in the storage device 107. In the fifth embodiment, Step S1501 is performed only before the first image acquisition and when the user performs a specific operation with the user interface. Examples of the operations with the user interface are the same as those in the fourth embodiment described above.

In Step S201, the image acquiring unit 101 performs the image acquisition. Steps S201 to S206 are the same as those in the first embodiment. In the fifth embodiment, Step S203 to Step S206 may be performed by the tracking unit 1302.

After Step S206, in Step S1502, the tracking unit 1302 determines whether the tracking area i (that is, the object of the human body corresponding to the tracking area i) is set as the target of the correction of the shift of the tracking position. If the tracking unit 1302 determines that the tracking area i is set as the target of the correction of the shift of the tracking position (YES in Step S1502), the process goes to Step S300. If the tracking unit 1302 determines that the tracking area i is not set as the target of the correction of the shift of the tracking position (NO in Step S1502), Step S300 is not performed and the process goes to Step S207. The processing in Step S300 in any of the first to third embodiments described above is performed as the operation in Step S300.

As described above, in the image processing apparatus 1300 of the fifth embodiment, the tracking area to which the tracking position shift correcting function is applied is set based on the user's operation. Consequently, according to the fifth embodiment, the user is capable of adjusting the accuracy for each human body to be tracked depending on the use case or the like and is capable of flexibly adjusting the balance between the accuracy and the computer load.

Sixth Embodiment

A sixth embodiment will now be described.

The example is described in the fifth embodiment in which the user sets an object the shift of the tracking position of which is to be corrected with the user interface. A case is described in the sixth embodiment in which the user sets an area to which the correction of the shift of the tracking position is applied with the user interface. The configuration of the image processing apparatus of the sixth embodiment is the same as that illustrated in FIG. 13.

Figure 16:
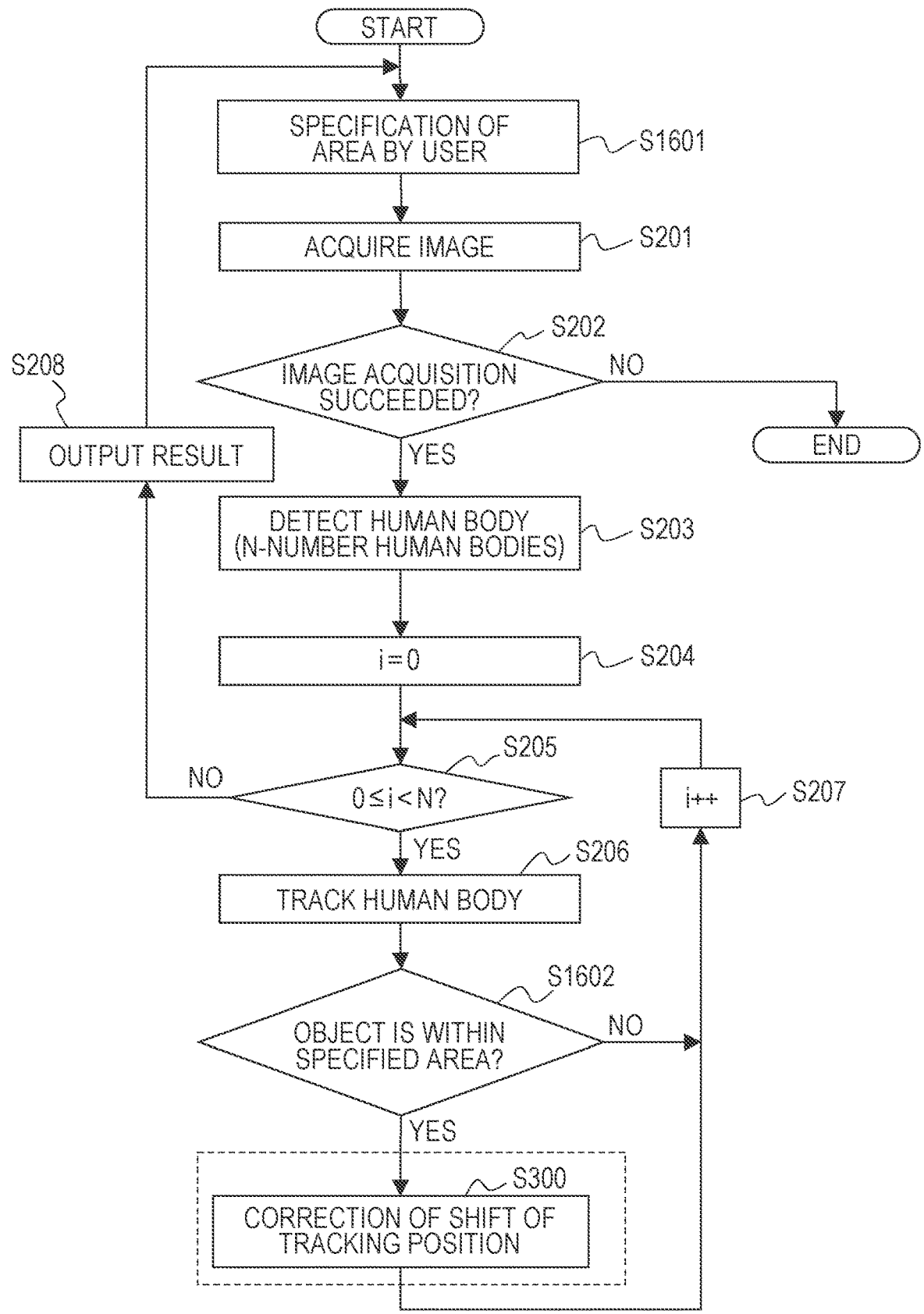
FIG. 16 is a flowchart illustrating an example of an image processing process in the image processing apparatus of a sixth embodiment.

FIG. 16 is a flowchart illustrating an example of an image processing process in the image processing apparatus of the sixth embodiment. FIG. 16 illustrates a processing flow from the detection and tracking of an object (human body) to the correction of the shift of the tracking position. The following description focuses on the difference from the first embodiment for simplicity. The same reference numerals are used in FIG. 16 to identify the same steps as those described in the above embodiments. A description of such steps is omitted herein.

Referring to FIG. 16, in Step S1601, the setting unit 1301 sets an image area which is specified by the user with the user interface and in which the shift of the tracking position is to be corrected. Specification information about the image area in which the correction of the shift of the tracking position is to be performed may be stored in the memory in the tracking unit 1302 or may be stored in the storage device 107. In the sixth embodiment, Step S1601 is performed only before the first image acquisition and when the user performs a specific operation with the user interface. Examples of the operations with the user interface are the same as those in the fourth embodiment described above.

In Step S201, the image acquiring unit 101 performs the image acquisition. Steps S201 to S206 are the same as those in the first embodiment. In the sixth embodiment, Step S203 to Step S206 may be performed by the tracking unit 1302.

After Step S206, in Step S1602, the tracking unit 1302 determines whether the position of the tracking area i is within the image area set in Step S1601. If the tracking unit 1302 determines that the position of the tracking area i is within the image area set in Step S1601 (YES in Step S1602), the process goes to Step S300. If the tracking unit 1302 determines that the position of the tracking area i is not within the image area set in Step S1601 (NO in Step S1602), Step S300 is not performed and the process goes to Step S207. The processing in Step S300 in any of the first to third embodiments described above is performed as the operation in Step S300.

As described above, in the image processing apparatus 1300 of the sixth embodiment, the area to which the correction of the shift of the tracking position is applied is set based on the user's operation. Consequently, according to the sixth embodiment, the user is capable of adjusting the accuracy for each image area and flexibly adjusting the balance between the accuracy and the computer load depending on the use case or the like.

Seventh Embodiment

A seventh embodiment will now be described.

The configuration of the image processing apparatus of the seventh embodiment is the same as that in FIG. 1 or FIG. 13 and a description of the components is omitted herein. The configuration in FIG. 1 is exemplified in the seventh embodiment for description.

In the seventh embodiment, the tracking unit 102 selects multiple tracking position candidates in estimation of the tracking position of the concerned human body. A method of more effectively suppressing the shift of the tracking position, compared with the first embodiment, by selecting the multiple tracking position candidates in the estimation of the tracking position of the concerned human body is described in the seventh embodiment.

Non-maximum suppression (NMS) disclosed in Pedro F Felzenszwalb, Ross B Girshick, and David McAllester, (2010) "Object detection with discriminatively trained part-based models," TPAMI, Vol. 32, No. 9 is exemplified as a method of determining the final detection result from the multiple tracking position candidates.

In the NMS, if the value of intersection-over-union (IoU) between a certain concerned region and a region having a higher score, among multiple scored regions in an image, is higher than or equal to a predetermined threshold value, rejection of the concerned region is repeatedly performed. The IoU is a value representing the ratio of overlapping of images. The IoU is represented by Equation (5):

$$\text{IoU} = (\text{Region } A \cap \text{Area of region } B)/(\text{Region } A \cup \text{Area of region } B) \quad (5)$$

A particle filter method disclosed in Genshiro Kitagawa (1996) "On Monte Carlo Filter and Smoother" Statistical Mathematics, Vol 44, No. 1, pp. 31-48 may be used as the method of determining the final detection result from the multiple tracking position candidates. In the particle filter method, multiple subsequent states that may occur from the current state are represented by many particles. In the particle filter method, weighted average of all particles is calculated based on the likelihood of each particle and the calculated weighted average is used as the subsequent state (the tracking position).

Alternatively, for example, a method of calculating the average of the multiple tracking position candidates to determine the final detection result from the multiple tracking position candidates may be used as the method of determining the final detection result from the multiple tracking position candidates. In this method of calculating the average, the average value of each of the center coordinates, the widths, and the heights of the tracking position candidates is calculated and the reference area having the calculated values is the detection result.

However, in the above methods, if the area similar to a human body to be detected exists around the human body, the similar area may be erroneously detected as the tracking position candidate. The tracking position candidate that is erroneously detected causes the shift of the detection position in the final detection result.

Figure 17A:
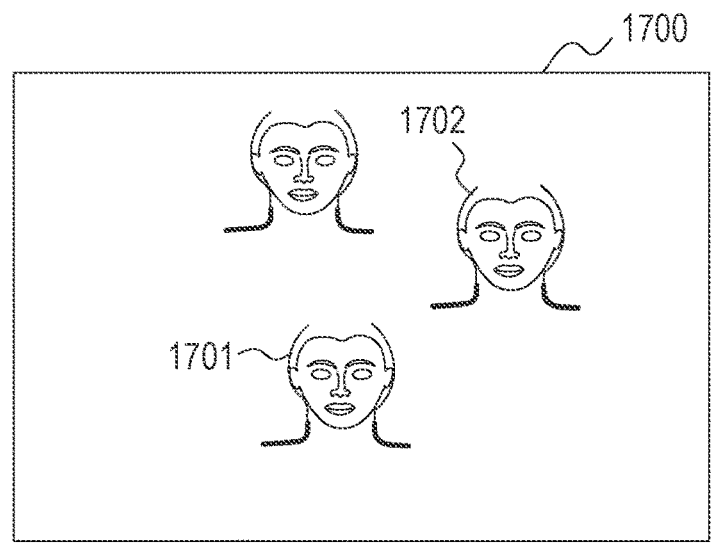
FIG. 17A to FIG. 17C are diagrams illustrating an example of a general process of detecting tracking target objects and a detection result in a seventh embodiment.
Figure 17B:
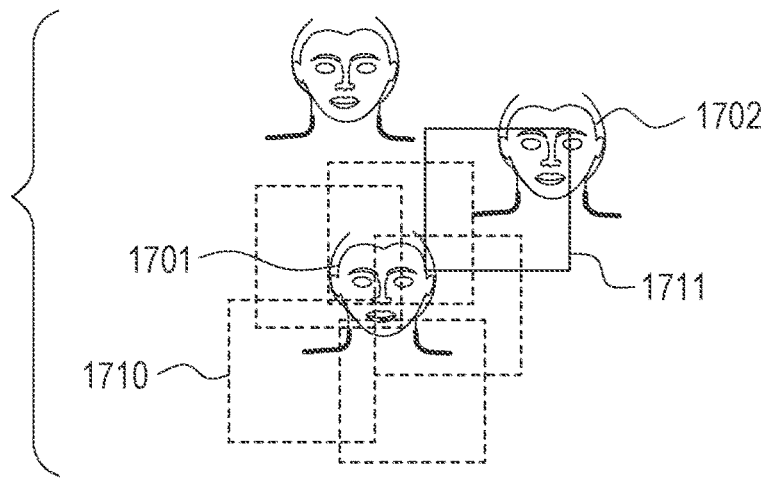
Figure 17C:
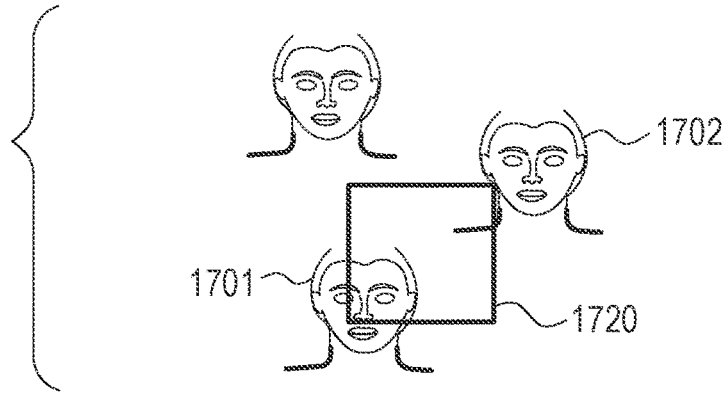

FIG. 17A to FIG. 17C are diagram illustrating an example of the general process of detecting the tracking target objects (the human bodies in this example) and a final detection result. FIG. 17A illustrates an example of a frame image 1700 before the detection and tracking process. FIG. 17B illustrates an image during the detection and tracking process. FIG. 17C illustrates an image after the detection and tracking process. The frame image 1700 in FIG. 17A is part of a frame image including detection target objects and human bodies 1701 and 1702 are concerned human bodies, which is the detection target objects. Referring to FIG. 17B, dotted-line bounding boxes indicate multiple tracking position candidates 1710 before the detection result is determined and a solid-line bounding box indicates a tracking position candidate 1711 that is erroneously detected. In the seventh embodiment, the detection result having a score higher than or equal to a predetermined value is the tracking position candidate. A bold-solid-line bounding box in FIG. 7C indicates an example of a final detection result 1720 in the general process of detecting the tracking target objects.

Although the final detection result should be a bounding box surrounding the human body 1701 that is being detected and tracked in the example in FIG. 17A to FIG. 17C, the final detection result 1720 is shifted toward the top right due to the tracking position candidate 1711 that is erroneously detected.

Figure 18A:
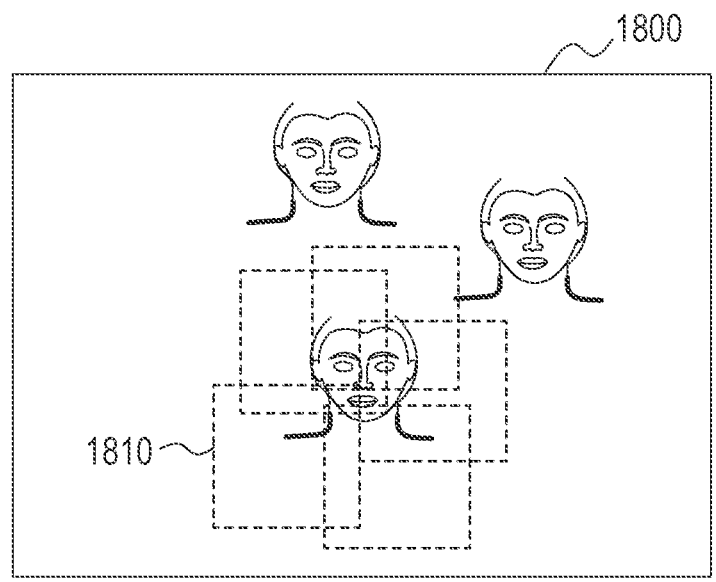
FIG. 18A to FIG. 18B are diagrams illustrating a process of detecting the tracking target objects for suppressing the shift of the tracking position and a detection result in the seventh embodiment.
Figure 18B:
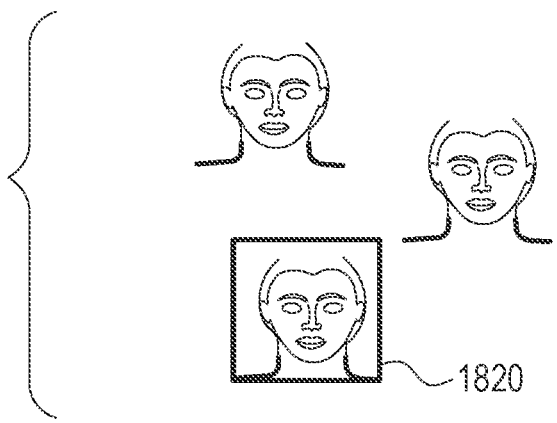

FIG. 18A and FIG. 18B are diagrams illustrating the process of detecting the tracking target objects (the human bodies) for suppressing the shift of the tracking position and a final detection result in the seventh embodiment. FIG. 18A illustrates part of a frame image 1800 to be detected and tracked. Dotted-line bounding boxes in FIG. 18A indicate multiple tracking position candidates 1810 before the detection result is determined. FIG. 18B illustrates an image after the detection and tracking process.

A method of determining the tracking position candidates in the seventh embodiment will now be described. First process to Fourth process are sequentially performed in the determination of the tracking position candidates.

First process: Only detection results each having a score or likelihood higher than or equal to a predetermined value are left as the tracking position candidates.

Second process: Moving estimated regions on the concerned frame are calculated based on the tracking results to the preceding frame for the tracking object (the tracking human body).

Third process: The IoU values between the regions of the tracking position candidates in First process and the respective moving estimated regions calculated in Second process are calculated.

Fourth process: Any tracking position candidate having an IoU value exceeding a predetermined threshold value in Third process is deleted regardless of its score or likelihood.

The tracking position candidate that is left after Fourth process is a final detection result 1820 indicated by a bold-solid-line bounding box in FIG. 18B. In the seventh embodiment, the final detection result 1820 is created through weighted averaging based on the scores of the tracking position candidates. The final detection result 1820 is a bounding box surrounding the human body that is being detected and tracked in the seventh embodiment.

As described above, the image processing apparatus 100 of the seventh embodiment selects the multiple tracking position candidates before the detection result is determined in the detection of the tracking target object. Consequently, according to the seventh embodiment, it is possible to suppress the shift of the tracking position more effectively.

The components in the image processing apparatus or the processing in the flowchart in each of the embodiments described above may be realized by hardware components or may be realized by software components. In the case of the software components, for example, a central processing unit (CPU) executes a program according to the embodiment. Alternatively, part of components or the processing in the flowchart may be realized by the hardware components and part thereof may be realized by the software components. The program for the software components may be prepared in advance, may be acquired from a recording medium, such as an external memory (not illustrated), or may be acquired via a network or the like (not illustrated).

Among the components in the image processing apparatus in each of the embodiments described above, the processing performed in, for example, the tracking unit, the locus analyzing unit, the locus smoothing unit, and the tracking position correcting unit may be processing to which artificial intelligence (AI) is applied. For example, a learned model that is subjected to machine learning may be used, instead of the components. In this case, the learned model is created, in which multiple combinations of input data and output data into and from the respective components are prepared as learning data, knowledge is acquired through the machine learning, and the output data corresponding to the input data is output as the result based on the acquired knowledge. The learned model is capable of being composed of, for example, a neural network. The learned model operates cooperatively with, for example, a CPU or a graphics processing unit (GPU) as a program to perform the same processing as in the components described above to perform the processing in the components described above. The learned model may be, for example, updated each time a certain amount of data is processed, if needed.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-140086, filed on Jul. 30, 2019, which is hereby incorporated by reference herein in its entirety.

What is claimed is:

1. An image processing apparatus that tracks a target object by estimating a position of the target object on each of a plurality of images, the image processing apparatus comprising:
  a processor; and
  a memory storing executable instructions which, when executed by the processor, cause the image capturing apparatus to perform operations including:
  performing a first estimation process to estimate the position of the target object in at least one of the plurality of images;
  performing a second estimating process to estimate the position of the target object in at least one of the plurality of images, wherein estimating accuracy of the position of the target object in the second estimating process is lower than the estimating accuracy in the first estimation process;
  correcting, based on the position of the target object estimated by the first estimation process on a first image of the plurality of images, the position of the target object estimated by the second estimation process on a second image of the plurality of the images, wherein the second image is an image captured at a different time from the first image; and
  determining a reliability of a tracking history composed of a plurality of positions estimated by the first estimation process or the second estimation process for the target object in each of the plurality of images.

2. The image processing apparatus according to claim 1, wherein the first estimation process is a process for estimating the position of the target object included in the image using a pattern matching.

3. The image processing apparatus according to claim 2, wherein the first estimation process is a process for estimating the position of the target object included in the image using a geometric pattern matching.

4. The image processing apparatus according to claim 1, wherein the second estimation process is an estimation process using an average velocity vector.

5. The image processing apparatus according to claim 1, wherein the second estimation process is a process for estimating the position of the target object included in the image using information of a color of the target object.

6. The image processing apparatus according to claim 1, wherein the second image is captured after the first image, and
  the position of the target object estimated by the second estimation process on the second image is corrected based on the position of the target object estimated by the first estimation process on the first image.

7. The image processing apparatus according to claim 6, wherein the position of the target object estimated by the second estimation process on the second image is corrected based on the position of the target object estimated by the first estimation process on the first image and the position of the target object estimated by the first estimation process on a third image which is captured after the second image.

8. The image processing apparatus according to claim 1, wherein the reliability of the tracking history is determined based on the number of the position of the target object estimated by the first estimation process in the plurality of positions composing the tracking history.

9. The image processing apparatus according to claim 1, wherein a degree of stability of a moving direction of the target object tracked by estimating the position is determined based on the first estimation process or the second estimation process and, if the degree of stability is higher than a predetermined threshold value, the position of the target object estimated by the first estimation process or the second estimation process is corrected on an image of an acquired latest frame.

10. The image processing apparatus according to claim 1, wherein executing the executable instructions causes the information processing apparatus to perform further operations including:
  presenting an occurrence of a shift of the position of the target object to a user.

11. The image processing apparatus according to claim 10,
  wherein a frame including the position of the target object is displayed on a display device and presents the occurrence of the shift of the position of the target object to the user by changing a color of the frame including the position of the target object.

12. The image processing apparatus according to claim 1, wherein the second image is captured before the first image, and
  the position of the target object estimated by the second estimation process on the second image is corrected based on the position of the target object estimated by the first estimation process on the first image and the position of the target object estimated by the first estimation process on a third image which is captured after the second image.

13. The image processing apparatus according to claim 1, wherein executing the executable instructions causes the information processing apparatus to perform further operations including:
  estimating an average velocity vector of the target object based on positions of the target object estimated by the first estimation process on the plurality of images, and
  the position of the target object estimated by the second estimation process on the second image is corrected based on the estimated average velocity vector of the target object.

14. The image processing apparatus according to claim 1, wherein the reliability of the tracking history is determined based on a ratio of a number of positions of the target object estimated by the first estimation process included in the tracking history.

15. The image processing apparatus according to claim 1, wherein if the reliability of the tracking history is higher than or equal to a first threshold value, position satisfying a first condition among the positions of the target object estimated by the second estimation process is corrected, and if the reliability of the tracking history is lower than the first threshold value, position satisfying a second condition among the positions of the target object estimated by the second estimation process is corrected.

16. The image processing apparatus according to claim 15,
wherein the first condition is that at least one of a position in the immediately preceding frame or a position in the immediately succeeding frame of the target object whose position is estimated by the second estimation processing is a position estimated by the first estimation processing,
the second condition is that only one of a position in the immediately preceding frame and a position in the immediately succeeding frame of the target object whose position is estimated by the second estimation processing is a position estimated by the first estimation processing.

17. The image processing apparatus according to claim 1, wherein executing the executable instructions causes the information processing apparatus to perform further operations including:
tracking the target object by estimating a position of the target object on each of the plurality of images, and wherein
the position of the target object on each of a plurality of images is selected based on a predetermined condition among a plurality of candidates for tracking positions.

18. A method of tracking a target object by estimating a position of the target object on each of a plurality of images, the method comprising:
performing a first estimation process to estimate the position of the target object in at least one of the plurality of images;
performing a second estimating process to estimate the position of the target object in at least one of the plurality of images, wherein estimating accuracy of the position of the target object in the second estimating process is lower than the estimating accuracy in the first estimation process;
correcting the position of the target object estimated by the second estimation process on a second image of the plurality of the images, based on the position of the target object estimated by the first estimation process on a first image of the plurality of images, wherein the second image is an image captured at a different time from the first image; and
determining a reliability of a tracking history composed of a plurality of positions estimated by the first estimation process or the second estimation process for the target object in each of the plurality of images.

19. A non-transitory computer-readable storage medium storing a program that, when executed by a computer, causes the computer to perform a method of tracking a target object by estimating a position of the target object on each of a plurality of images, the method comprising:
performing a first estimation process to estimate the position of the target object in at least one of the plurality of images;
performing a second estimating process to estimate the position of the target object in at least one of the plurality of images, wherein estimating accuracy of the position of the target object in the second estimating process is lower than the estimating accuracy in the first estimation process;
correcting the position of the target object estimated by the second estimation process on a second image of the plurality of the images, based on the position of the target object estimated by the first estimation process on a first image of the plurality of images, wherein the second image is an image captured at a different time from the first image; and
determining a reliability of a tracking history composed of a plurality of positions estimated by the first estimation process or the second estimation process for the target object in each of the plurality of images.

* * * * *